United States Patent
Juneau

(10) Patent No.: US 10,652,038 B2
(45) Date of Patent: May 12, 2020

(54) SYSTEMS AND METHODS FOR DETECTING AND INTERFERING WITH COMPROMISED DEVICES AND UNAUTHORIZED DEVICE RELOCATION IN A COMMUNICATION NETWORK

(71) Applicant: MAXXIAN TECHNOLOGY INC., Thornhill (CA)

(72) Inventor: Rene Juneau, Thornhill (CA)

(73) Assignee: Maxxian Technology Inc., Markham, Ontario (CA)

( * ) Notice: Subject to any disclaimer, the term of this patent is extended or adjusted under 35 U.S.C. 154(b) by 218 days.

(21) Appl. No.: 15/704,239

(22) Filed: Sep. 14, 2017

(65) Prior Publication Data
US 2018/0006839 A1    Jan. 4, 2018

Related U.S. Application Data

(63) Continuation of application No. PCT/CA2016/000083, filed on Mar. 24, 2016.
(Continued)

(51) Int. Cl.
*H04L 29/06* (2006.01)
*H04L 12/22* (2006.01)
(Continued)

(52) U.S. Cl.
CPC .............. *H04L 12/22* (2013.01); *H04L 63/14* (2013.01); *H04W 4/029* (2018.02);
(Continued)

(58) Field of Classification Search
CPC ....... H04L 12/22; H04L 63/14; H04L 63/107; H04L 2463/101; H04W 4/029; H04W 12/1206; H04W 12/0802; H04W 12/00503
See application file for complete search history.

(56) References Cited

U.S. PATENT DOCUMENTS 6,134,659 A * 10/2000 Sprong ................. G06F 21/121
                                                            380/255
7,958,524 B2 * 6/2011 Juneau ................ H04L 63/1408
                                                            725/104
(Continued)

FOREIGN PATENT DOCUMENTS

| EP | 1 334 601 A2 | 8/2003 |
| WO | WO 2011/011441 A2 | 1/2011 |
| WO | WO2011011441 A1 | 1/2011 |

OTHER PUBLICATIONS

International Report and Written Opinion dated Sep. 26, 2017 for Application No. PCT/CA2016/000083, 14 pages.
(Continued)

*Primary Examiner* — Sarah Su
(74) *Attorney, Agent, or Firm* — Fish & Richardson P.C.

(57) ABSTRACT

Systems and methods for detecting and interfering with compromised devices and unauthorized device relocation in a communication network are disclosed. The described embodiments may be deployed in a content delivery network where receivers have been compromised in a manner that renders the conditional access system (CAS) inoperative at controlling the receivers' ability to receive content. In some embodiments, alternate commands not protected by the CAS system may be used to detect hacked devices and interdict same. In some embodiments, service devices in the content delivery network may allow for detection of unauthorized device relocation.

6 Claims, 8 Drawing Sheets

Related U.S. Application Data

(60) Provisional application No. 62/177,934, filed on Mar. 26, 2015.

(51) Int. Cl.
*H04W 4/029* (2018.01)
*H04W 12/08* (2009.01)
*H04W 12/12* (2009.01)
*H04W 12/00* (2009.01)

(52) U.S. Cl.
CPC ... *H04W 12/0802* (2019.01); *H04W 12/1206* (2019.01); *H04L 63/107* (2013.01); *H04L 2463/101* (2013.01); *H04W 12/00503* (2019.01)

(56) References Cited

U.S. PATENT DOCUMENTS

| | | | |
|---|---|---|---|
| 8,671,457 B2 | 3/2014 | Juneau | |
| 8,745,758 B2* | 6/2014 | Cholas | H04N 21/2541 726/29 |
| 10,142,668 B1* | 11/2018 | Nijim | H04N 21/4104 |
| 10,311,439 B2* | 6/2019 | Jajara | G06Q 20/322 |
| 2002/0083434 A1* | 6/2002 | Bacso | G06Q 30/02 725/9 |
| 2002/0112240 A1* | 8/2002 | Bacso | G06Q 30/02 725/47 |
| 2002/0116510 A1* | 8/2002 | Bacso | G06Q 30/02 709/230 |
| 2002/0124182 A1* | 9/2002 | Bacso | G06Q 30/02 726/26 |
| 2007/0155403 A1* | 7/2007 | Bishop | H04L 63/10 455/456.1 |
| 2007/0174472 A1 | 7/2007 | Kulakowski | |
| 2007/0283162 A1 | 12/2007 | Nonaka | |
| 2009/0327717 A1 | 12/2009 | Jin | |
| 2011/0030065 A1* | 2/2011 | Kulakowski | H04N 21/6334 726/26 |
| 2012/0026884 A1* | 2/2012 | Sundell | H04W 8/065 370/235 |
| 2014/0013420 A1* | 1/2014 | Picionielli | G06F 21/88 726/17 |
| 2014/0087762 A1* | 3/2014 | Galvin | G01S 19/17 455/456.3 |
| 2014/0189353 A1 | 7/2014 | Apsangi | |
| 2014/0200929 A1* | 7/2014 | Fitzgerald | G06F 21/88 705/4 |
| 2016/0105801 A1* | 4/2016 | Wittenberg | H04W 4/029 455/411 |
| 2016/0140562 A1* | 5/2016 | Birukov | G06Q 20/3224 705/39 |

OTHER PUBLICATIONS

Supplementary European Search Report and European Search Opinion dated Nov. 2, 2018 for Application No. EP16767563.6, 13 pages.
Notification Concerning Transmittal of International Preliminary Report on Patentability (Chapter I of The Patent Cooperation Treaty), dated Oct. 5, 2017 for International Application No. PCT/CA2016/000083, 1 page.
International Preliminary Report on Patentability, dated Sep. 26, 2017 for International Application No. PCT/CA2016/000083, 1 page.
International Search Report dated Jun. 15, 2016 for International Application No. PCT/CA2016/000083, 3 pages.

* cited by examiner

US 10,652,038 B2

SYSTEMS AND METHODS FOR DETECTING AND INTERFERING WITH COMPROMISED DEVICES AND UNAUTHORIZED DEVICE RELOCATION IN A COMMUNICATION NETWORK

CROSS-REFERENCE TO RELATED APPLICATIONS

This application is a continuation of PCT/CA2016/000083, filed Mar. 24, 2016, which claims the benefit of U.S. Pat. App. No. 62/177,937, filed Mar. 26, 2015, both of which are hereby incorporated by reference.

FIELD OF THE DISCLOSURE

The present invention is generally directed to the detection of and interference with compromised devices and other unauthorized activity in respect to communication networks, such as the hacking of devices that are connected to such networks or the unauthorized relocation of such devices on such networks.

BACKGROUND

In computer networks such as a content delivery network (e.g., a cable/digital/Internet Protocol television (IPTV) distribution network) for delivering audio/video signals to computing devices (e.g., set-top video and audio receivers), there are typically conditional access systems (abbreviated "CAS" herein) that restrict access by the computing device to certain content available on the computer network.

The CAS is typically relied upon by service providers (e.g., cable or subscription television providers) to restrict access to content by unauthorized computing devices. However, some computing devices can be compromised so that the CAS is not effective at restricting access to the content by the compromised computing devices.

Additionally, computing devices may be intended by the content provider to operate in a single or set of geographical locations. For example, set-top boxes provided by a cable television operator to a home subscriber may be intended to operate solely from the particular subscriber's home (and not, for example, at a commercial establishment such as a bar or pub). However, it may be difficult to prevent usage of a computing device that has relocated to another location in unauthorized manner.

There is thus a need for improved systems and methods for detecting and interfering with compromised devices and unauthorized device relocation in a communication network.

BRIEF DESCRIPTION OF THE DRAWINGS

Non-limiting examples of various embodiments of the present disclosure will next be described in relation to the drawings, in which.

DETAILED DESCRIPTION

Figure 1:
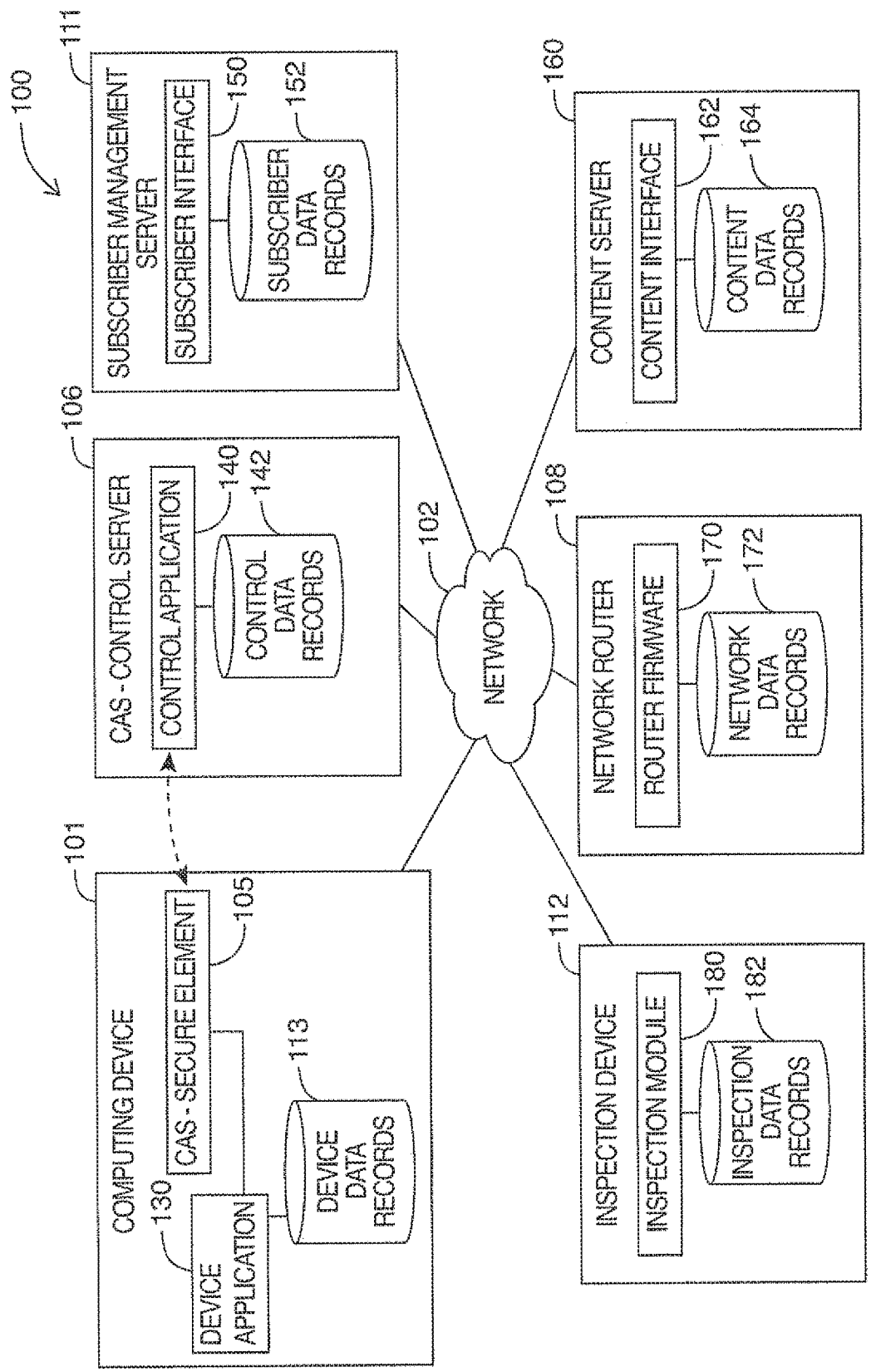
FIG. 1 is a block diagram of a system for detecting and interfering with compromised devices and unauthorized device relocation in a communication network, in accordance with at least one embodiment of the present invention.

In a first broad aspect of the present disclosure, there is provided a method of detecting a pirated computing device in a content delivery network, the method comprising: identifying a computing device, the computing device being associated with a secure element configured to receive commands from a control server, wherein the commands are designed to restrict access by the computing device to content available on the content delivery network, and wherein the secure element is unresponsive to the commands; transmitting an alternate command to the computing device, the alternate command being different from any command of the commands that the secure element is configured to receive from the control server; receiving a response to the transmitted alternate command from the computing device; and determining that the computing device is pirated based on the computing device providing a response to the alternate command when the secure element associated with the computing device is unresponsive to the commands from the control server.

In some embodiments, the secure element and the control server collectively form a control access system. In some embodiments, when the secure element is unresponsive to the commands, the secure element being inoperative to restrict access by the computing device to the content available on the content delivery network. In some embodiments, before determining that a computing device is pirated, the method further comprises determining if the response received from the computing device matches an expected response for the alternate command.

In some embodiments, to identify the computing device, the method further comprises: analyzing records of a network router to identify a plurality of computing devices that have connected to the network router; verifying respective device identifiers of the plurality of computing devices against data in one of a control server and a subscriber management server; and if any device identifier is absent from the corresponding data, then identifying the computing device associated with the device identifier as a target for the alternate command.

In another broad aspect of the present disclosure, there is provided a method of detecting a pirated computing device in a content delivery network, the method comprising: retrieving a device data record from a computing device, the device data record having first information that corresponds to second information stored on a service device of the content delivery network; comparing the first information from the device data record to the second information stored on the service device of the content delivery network; and determining that the computing device is pirated if the first information from the device data record is inconsistent with the second information stored on the service device on the content delivery network.

In some embodiments, the device data record is retrieved from a secure element provided within the computing device, the secure element being configured to receive commands, from a control server, that are designed to restrict access by the computing device to content available on the content delivery network, and wherein the service device comprises the control server.

In some embodiments, the device data record is retrieved from a non-secure element component of the computing device, and the service device is a conditional access system that comprises a secure element associated with the computing device and a control server, the secure element being configured to receive commands, from the control server, that are designed to restrict access by the computing device to content available on the content delivery network. In some embodiments, the secure element is provided on the computing device.

In some embodiments, the first information of the device data record and the second information stored on the service device comprises at least one of: an internal identifier of the computing device, a security identifier of the computing device, a device model of the computing device, and a software version of an application executing on the computing device.

In some embodiments, the first information of the device data record comprises an authorization expiry date stored on the computing device, and the second information stored on the service device comprises a maximum authorization duration, and wherein the first information is determined to be inconsistent with the second information if a remaining duration of authorization determined from the authorization expiry date exceeds the maximum authorization duration.

In some embodiments, the second information stored on the service device comprises an earlier version of the device data record retrieved from the computing device prior to the retrieving.

In some embodiments, prior to retrieving the device data record from the computing device, the method further comprises identifying the computing device by: analyzing records of a network router to identify a plurality of computing devices that have connected to the network router; verifying respective device identifiers of the plurality of computing devices against corresponding data in one of a control server and a subscriber management server; and if any device identifier is absent from the corresponding data, then identifying the computing device associated with the device identifier as a target from which the device data record is to be retrieved.

In another broad aspect of the present disclosure, there is provided a method of detecting a pirated computing device in a content delivery network, the method comprising: transmitting a command addressed for receipt by any computing device having a specified device address, wherein upon receipt, the command causes the computing device to transmit a communication; analyzing the one or more communications emanating from a corresponding one or more computing devices receiving the transmitted command; determining that at least one of the one or more computing devices receiving the transmitted command is a pirated computing device if characteristics of the one or more communications caused by the transmitted command is outside of acceptable parameters for communications caused by the transmitted command.

In some embodiments, the acceptable parameters for communications caused by the transmitted command is that a single communication will be caused by the transmitted command, and wherein the one or more communications caused by the transmitted command comprises two communications. In some embodiments, the acceptable parameters for communications caused by the transmitted command is that the one or more communications would emanate from a single network segment, and wherein the one or communications caused by the transmitted command emanates from more than one network segment.

In some embodiments, the acceptable parameters for communications caused by the transmitted command is that the one or more communications would not be emanated within a predetermined period of time, and wherein the one or more communications caused by the transmitted command is emanated within the predetermined period of time.

In some embodiments, the command is selected from the group consisting of: reboot, startup, and shutdown. In some embodiments, the specified device address comprises a physical address.

In another broad aspect of the present disclosure, there is provided a method of confirming unauthorized relocation of a computing device in a content delivery network, the method comprising: identifying a location of the computing device; determining that the location of the computing device is different from an expected location of the computing device; reading records of a subscriber management server, the records being associated with the computing device; determining if the records indicate there that relocation of the computing device from the expected location to the identified location is a result of legitimate activity; if the relocation of the computing device from the expected location to the identified location is determined not to be the result of legitimate activity, confirming that the computing device being relocated from the expected location to the identified location is an unauthorized relocation.

In some embodiments, the expected location of the computing device is determined from a household identifier associated with an account associated with the computing device stored on the subscriber management server. In some embodiments, the location of the computing device is identified from a network segment or a network branch on which the computing device is connected to the content delivery network.

In some embodiments, the records comprise communication records, and wherein if the communication records indicate that there has been recent communication on an account associated with the computing device, the relocation of the computing device from the expected location to the identified location is determined to be the result of legitimate activity.

In some embodiments, the records comprise device migration records, and wherein if the communication records indicate that there has been a bulk relocation of multiple computing devices including the computing device, the relocation of the computing device from the expected location to the identified location is determined to be the result of legitimate activity.

In some embodiments, the computing device comprises a secure element configured to receive commands from a control server, the commands being designed to interdict the computing device upon receipt of the commands, and the method further comprises: transmitting an alternate command to the computing device, the alternate command being different from any command of the commands that the secure element is configured to receive from the control server to interdict the computing device; and upon the computing device executing the alternate command, access by the computing device to content available on the content delivery network is disrupted.

In another broad aspect of the present disclosure, there is provided a method of interfering with operation of a pirated computing device in a content delivery network, the pirated computing device having unauthorized access to content available on the content delivery network, the method comprising identifying the pirated computing device to be targeted for interference, the pirated computing device being associated with a secure element configured to receive commands from a control server, wherein the commands are designed to interdict the pirated computing device upon receipt of the commands, and wherein the secure element is unresponsive to the commands; transmitting an alternate command to the pirated computing device, the alternate command being different from any command of the commands that the secure element is configured to receive from the control server to interdict the pirated computing device; and upon the pirated computing device executing the alternate command, access by the pirated computing device to the content available on the content delivery network is disrupted.

In some embodiments, the alternate command is selected from: a reboot command and a shutdown command. In some embodiments, the alternate command disrupts network connectivity of the pirated computing device to the content delivery network. In some embodiments, the alternate command is selected from the group consisting of: drop Internet Protocol (IP) address, release IP address, or renew IP address. In some embodiments, the alternate command inserts garbage data into records of the pirated computing device related to network addresses. In some embodiments, the alternate command comprises a channel change command, and the method further comprises repeatedly transmitting the channel change command to the pirated computing device. In some embodiments, the alternate command updates the channel map of the content channels accessible by the pirated computing device.

In some embodiments, the disruption of access to content available on the content delivery network by the pirated computing device is restored upon a reset of the computing device, and the method further comprises: analyzing records of a network router to identify appearance of the pirated computing device on the content delivery network; and re-transmitting the alternate command to the computing device.

In another broad aspect of the present disclosure, there is provided a method of interfering with operation of a pirated computing device in a content delivery network, the pirated computing device having unauthorized access to content available on the content delivery network, the method comprising: identifying the pirated computing device to be targeted for interference, the computing device being associated with a secure element configured to receive commands from a control server, wherein the commands are designed to interdict the computing device upon receipt of the commands, and wherein the secure element is unresponsive to the commands; and transmitting an alternate command to a service device on the content delivery network, the service device being different from the control server, and the service device stores data records referenced by the pirated computing device when the pirated computing device accesses the content on the content delivery network, wherein the alternate command modifies the data records; wherein upon an attempt by the pirated computing device to access the content available on the content delivery network, the referencing of the modified data records by the pirated computing device interferes with access to the content available on the content delivery network by the pirated computing device.

In some embodiments, the alternate command comprises a network command that disrupts network connectivity of the pirated computing device to the content delivery network. In some embodiments, the service device comprises a network router and the alternate command is transmitted to the network router to de-allocate a network address previously allocated to the pirated computing device. In some embodiments, the data records stored by the service device comprises a blacklist registry for computing devices that are denied access to the content available on the content delivery network, and the alternate command comprises adding an identifier of the pirated computing device to the blacklist registry. In some embodiments, the data records stored by the service device comprises identifiers for computing devices that are permitted to access the content available on the content delivery network, and the alternate command comprises deleting an identifier of the pirated computing device from the data records.

In another broad aspect of the present disclosure, there is provided an inspection device comprising a processor and a memory storing instructions which, when executed by the processor causes the processor to perform any of the methods described herein.

In another broad aspect of the present disclosure, there is provided a computer readable medium storing instructions for execution by a processor of an inspection device, wherein when the instructions are executed by the processor, the processor performs the any of the methods described herein.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, certain steps, signals, protocols, software, hardware, networking infrastructure, circuits, structures, techniques, well-known methods, procedures and components have not been described or shown in detail in order not to obscure the embodiments generally described herein.

Furthermore, this description is not to be considered as limiting the scope of the embodiments described herein in any way. It should be understood that the detailed description, while indicating specific embodiments, are given by way of illustration only, since various changes and modifications within the scope of the disclosure will become apparent to those skilled in the art from this detailed description.

The embodiments of the methods described herein may be implemented in hardware or software, or a combination of both. In some cases, embodiments may be implemented in one or more computer programs executing on one or more programmable computing devices (e.g., the inspection device discussed below) including at least one processor (e.g., a microprocessor), a data storage device (including in some cases volatile and non-volatile memory and/or data storage elements), at least one communications interface (e.g., a network interface card for wired or wireless network communications, as discussed below), at least one input device, and at least one output device. For example and without limitation, the programmable computing devices may be a personal computer, laptop, personal data assistant, cellular telephone, smartphone device, tablet computer, smartwatch, and/or wireless device. Additional examples of programmable computing devices are also discussed below. Program code is applied to input data to perform the functions described herein and generate output information. The output information is applied to one or more output devices.

Those of skill in the art will understand that the following description of illustrative embodiments of the disclosure does not limit the implementation of embodiments of the disclosure to any particular computer programming language. For example, in some embodiments, each program, module, or application may be implemented in a high level procedural or object oriented programming and/or scripting language to communicate with a computer system. However, the programs can be implemented in assembly or machine language, if desired. In any case, the language may be a compiled or interpreted language.

More specifically, embodiments of the disclosure may be implemented in any computer programming language provided that the operating system (O/S) provides the facilities that may support the present disclosure. For instance, an embodiment of the present disclosure may be implemented in part in the JAVA™ computer programming language (or other computer programming languages such as C, C++, Objective-C, C#, or Swift). Those skilled in the art will also appreciate that any limitations presented by such an embodiment would be a result of a particular type of operating system or computer programming/scripting language and would not be a limitation of the present disclosure.

In some embodiments, the computing devices and methods as described herein may also be implemented as a transitory or non-transitory computer-readable storage medium configured with a computer program, wherein the storage medium so configured causes a computing device to operate in a specific and predefined manner to perform at least some of the functions as described herein. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled, non-compiled, bytecode, or other forms in which the instructions may be interpreted or translated.

Additional aspects and advantages of the present disclosure will be apparent in view of the description which follows.

System Overview

Referring to FIG. 1, shown there generally as 100 is a block diagram of a system for detecting and interfering with compromised devices and unauthorized device relocation in a communication network, in accordance with at least one embodiment of the present invention. The system 100 may include a computing device 101, a control server 106 (shown as "CAS-Control Server" in FIG. 1), a subscriber management server 111, a network router 108, a content server 160, and an inspection device 112. A network 102 may allow communications between and amongst these various devices and servers.

The system 100 may generally be referred to as a "content delivery network" herein, where content available on content server 160 is provided to the computing device 101 in a controlled manner by the CAS. As used herein, the term "facilities" may refer to any type of content or service that can be accessible by a computing device 101. For example, facilities may include television signals (whether by cable, IPTV, or satellite), video-on-demand (VOD), web applications, and/or an electronic program guide (EPG).

As used herein, the term "service device" may include any device or server within the content delivery network that provides or accesses the facilities. Examples of service devices include: the network router 108, content server 160 (e.g., a VOD server), a television head end, a telephony switch, an Internet gateway, a voice switch, a Virtual Private Network (VPN) server, a Tor server, and a file services server. Additional examples of service devices include IPTV systems (where IPTV is the term known to those of skill in the art for video delivered over Transmission Control Protocol/Internet Protocol (TCP/IP) networks such as the Internet using a variety of protocols), switched digital video systems, Internet servers, e-commerce servers, communication servers and gateways for text, audio, video and other messaging gateways, content or application delivery gateways, billing systems, subscriber management servers (SMS), customer relationship management system (CRM) and other like servers.

The computing device 101 may typically be a set-top box video and/or audio receiver. However, in some embodiments, the computing device may also be suitable computing device or terminal that is configured to receive audio, visual, or other data content from a content server 160. The computing device 101 may have a device application 130 that executes on the computing device 101 to provide access to content available on the network. For example, the computing device 101 may be a tablet computer configured with a software application 130 that allows a television subscriber to access video content through the software application 130. The device application 130 of the computing device 101 may access device data records 113 of the computing device 101.

The computing device 101 may have a secure element 105 (shown in FIG. 1 as "CAS-Secure Element") that controls access by the computing device 101 to content available from a content server 160. For example, the ability of the computing device 101 to communicate, access data or use any item of functionality on the content delivery network may be controlled by the secure element. In some embodiments, the secure element 105 may have a secure memory that may be separated from the memory space of the computing device 101. As discussed below, while this secure element 105 is intended to prevent tampering and ensure that control of access to content is maintained for the computing device 101, the secure element 105 may still be compromised, such that the other methods of detecting pirated devices or unauthorized device relocation discussed herein may be desirable.

Although illustrated in FIG. 1 as being housed within the computing device 101, in various embodiments, the secure element may be provided as a module separate from the computing device 101 (e.g., connected by wired or wireless means), operating therefrom to control the computing device 101.

Examples of components used to implement secure element 105 include Subscriber Identity Module (SIM) cards as used in mobile phones, and/or a combination of computer chips designed for secure download of security software known as downloadable conditional access system chips. In various embodiments, these components may be provided within set-top-television receivers, computing tablets, or other computing devices 101. In some embodiments, the secure element may be implemented as a software application residing in protected or unprotected memory or other storage on computing device 101.

Collectively, the secure element 105 and one or more control servers 106 may form the CAS. The control server 106 may contain a control application 140 that communicates with the secure element 105 to control operations of the computing device 101. In doing so, the control application 140 may access control data records 142.

When communicating with the secure element 105, the control server 106 may use encryption and decryption control, encryption key management, and other capabilities to secure communications. Similar technologies may also be used by the CAS to control access to facilities, or to secure access to data stored within a component of conditional access system CAS (e.g., data within the secure element 105 or the control server 106), or to secure data being transmitted on network 102 for the provision of content to computing devices 101. In some embodiments, the control application 140 may implemented across multiple control servers 106, and the above-noted encryption technologies may be used to ensure secure communications amongst such multiple control server 106. Similarly, a control server 106 may communicate with groups of computing devices 101, and may therefore communicate simultaneously with corresponding groups of respective secure elements 105.

The ability to control rights to access content available from the facilities is intended to be exclusive to the CAS, and the designs of the control server 106, the secure elements 105 and the communication protocols between them are intended to be secure and tamper-proof.

However, despite this intention, the hardware and software of a secure element 105 (or the associated hardware or software within a computing device 101) may potentially be compromised so that the CAS is inoperative to control the computing device 101. For example, such compromising may allow unauthorized access to additional facilities that is not authorized to be accessed by a subscriber. In some embodiments, the compromising may prevent de-authorization by the control server 106 of access to facilities already authorized in the secure element secure element 105. Additionally or alternatively, in cases where control of access by the CAS and the secure element 105 are governed by an authorization expiry, the compromising may cause a change to the associated authorization expiry deadlines for facilities within secure element 105.

Modification of the hardware or software of a computing device 101 to compromise or work around the features of the CAS may include mechanisms to read data from the secure element 105, to write data to the secure element 105, to emulate the functions of secure element 105 in software, and modification of the network interface hardware address of computing device 101 to prevent the control commands of control server 106 from reaching a secure element 105 associated with a computing device 101. In some instances, the "hacks" that allow the compromising of computing devices 101 noted may include various physical methods of reading data from or writing data to the secure storage within secure element 105 and/or modification of network components of the computing device 101 to prevent a control server 106 from communicating with a secure element 105 to disable unauthorized functionality.

As used herein, a "hacked" computing device 101 refers to a computing device 101 in which at least one control mechanism of the CAS has been compromised or for which a feature of computing device 101 has been modified to hinder operation of the CAS. The "hacked" term is typically referred to as the device 101 having been "hacked", with the "hack" being the method by which the compromising has been accomplished. The term "pirated" may generally have a similar meaning to "hacked" herein.

As discussed in greater detail below, the inspection device 112 may communicate and make reference to a number of non-CAS devices or servers to perform the methods described herein (e.g., to detect the presence of a pirated computing device on the network 102 or verify whether a suspected pirated computing device is or is not a pirated computing device). For example, some such servers with which the inspection device 112 may communicate with include a subscriber management server 111, a network router 108, a content server 160, or other service devices.

A subscriber management server 111 (e.g., operated by the operator of content delivery network) manages legitimate customer orders and billing that typically result in content authorizations being relayed to the control server 106. The subscriber management server 111 may have an externally accessible subscriber interface 150, through which accesses to subscriber data records 152 may be read.

A network router 108 may be any suitable network equipment forming part of network 102 that allows computing device 101 to access the content available on a content delivery network. The network router 108 may have router firmware 170 (or other analogous software operating the network router 108) that accesses (and may make accessible) network data records 172.

The make and model of network routers 108 may vary depending on the underlying technology implementing the content delivery network. Examples of network routers 108 include custom routers used for set-top communication on cable networks; Cable Modem Termination System (CMTS) routers for Data Over Cable Service Interface Specification (DOCSIS) communication with set-tops and cable modems on coaxial cable networks; Digital Subscriber Line Access Multiplexer (DSLAM) devices on various DSL technology networks; IP network routers; telephony switches; wireless network hubs, cellular telephony base stations and network equipment; and other suitable network communication components.

A content server 160 may be any suitable network server or component that provides access to facilities accessible by a computing device 101. As noted, an example of a content server 160 may be a VOD server or a television head end. The content server 160 may a content interface 162 for providing external access to the content server 160. The content interface 162 may access the content data records 164 related to the content made available by the content server 160.

Inspection device 112 may include one or more computing components (e.g., inspection module 180) to implement the methods described herein. The inspection device 112 may be a suitable device with computing capabilities for processing, storage (e.g., in inspection data records 182), and network access to network 102. Communication between inspection device 112 and other devices and/or server on the network 102 may be through an interface to network 102 or another device connected to network 102 and various interconnects known to those of skill in the art between instances and types of networks 102.

Devices and servers on network 102 that inspection device 112 may access can include: one or more of computing devices 101, components of the CAS (e.g., secure element 105 or control server 106), a subscriber management server 111, a network router 108, a content server 160, or other service devices. Corresponding data records on each device or server may be retrieved using a variety of protocols from a variety of subsystems within computing device 101. Examples include custom, proprietary and other protocols such as Simple Network Management Protocol (SNMP), the protocol for the CAS to communicate with secure element 105, diagnostic protocols, and other similar protocols.

Network 102 may consist of one or more different wired, wireless, electrical, optical, acoustic, thermal or other networks for communicating between and among various devices and servers. Generally, the term "Network" as used herein may refer to the physical components that enable electronic communication. However, the term may also refer to the "content delivery network", which refers to the system 100 as a whole.

As illustrated in FIG. 1, various single servers, devices, and data stores are shown. However, it will be understood that any single server or data store may spread across multiple servers (e.g., in a hosted environment). Similarly, it will be understood that the system 100 may have multiple computing devices 101 for receiving content from a content server 160, and which may be the subject of the methods performed by an inspection device 112 herein.

Operation of the Inspection Device in One Example Embodiment

Figure 2:
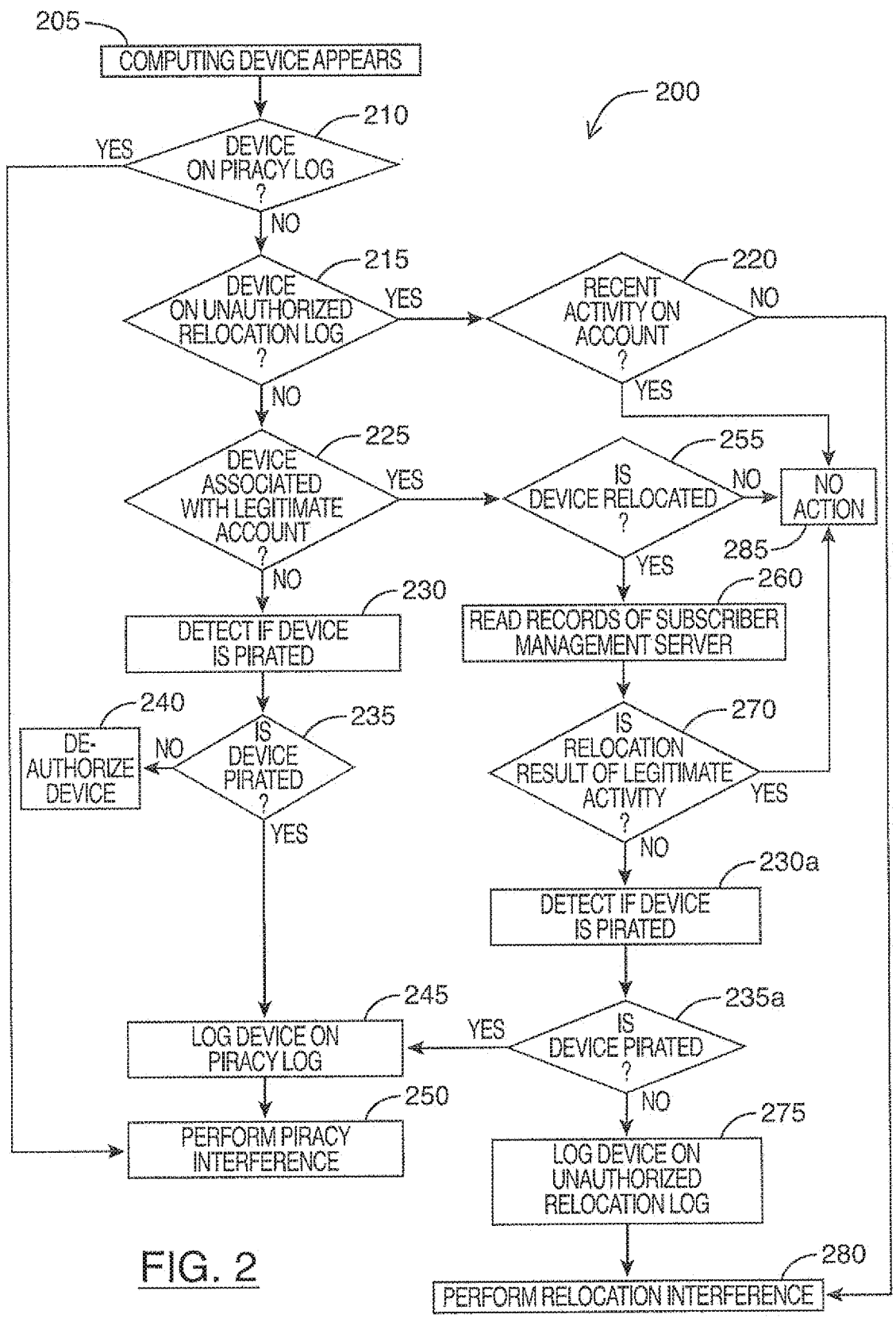
FIG. 2 is a flowchart diagram illustrating steps for detecting and interfering with compromised devices and unauthorized device relocation in a communication network, in accordance with at least one embodiment of the present invention.

Referring to FIG. 2, shown there generally as 200 is a flowchart diagram illustrating steps for detecting and interfering with device hacking and unauthorized device relocation in a communication network, in accordance with at least one embodiment of the present invention. In describing the steps of FIG. 2, reference will simultaneously be made to the components of the system shown in FIG. 1. In some embodiments, the various steps of FIG. 2 may be performed by the inspection device 112 of FIG. 1.

At step 205, the appearance of a computing device 101 on the network 102 may be detected. For example, this may be performed by inspecting a data record of a service device. For example, this may involve the inspection device 112 reading the network data records 172 of network router 108 to determine if a new computing device has attempted to connect (or is already connected) to the network 102. A data record generated from such activity of computing device 101 on network 102 may be used to determine that the computing device 101 is communicating on network 2.

For example, where the computing device 101 is a receiver on a content delivery network such as a cable television network, one or more instances of data records from service devices may contain information such as serial number for the receiver, its network address, the particular network segment from which the receiver is communicating, a security identifier, the software or hardware version associated with the receiver or other like information. From this information, the appearance of a computing device 101 on the network 102 may be detected.

At step 210, the inspection device 112 may determine whether the identified computing device 101 appears on a piracy log. A piracy log may be a list of identifiers for computing devices that are known to be pirated (e.g., as discussed above, operational on the content delivery network, but for which the CAS is inoperative at controlling the computing device 101). By first checking whether a detected computing device 101 appears on the piracy log, the inspection device 112 may operate in a more efficient manner and proceed directly to piracy interference 250 without performing the steps discussed below in relation to detecting piracy. As discussed in relation to step 245 below, upon completion of the piracy detection step and a computing device 101 being determined to be pirated, the computing device 101 may be logged on the piracy log so that future networks connections by the same computing device 101 may be interfered with more efficiently.

If the computing device 101 is determined to be on the piracy log (the 'YES' branch of step 210), then the method may proceed to step 250 to perform piracy interference (discussed below). If the computing device 101 is not determined to be on the piracy log (the 'NO' branch of step 210), then the method may proceed to step 215.

At step 215, the inspection device may determine whether the computing device 101 appears on a log of unauthorized computing devices. As noted above, computing devices 101 that may not be pirated may nevertheless still be relocated to a different geographic location in an unauthorized manner. By referencing the unauthorized relocation log prior to proceeding with further steps of detecting piracy or device relocation discussed below, the inspection device 112 may be configured to operate in a more efficient manner by not performing those steps and immediately proceeding to step 220 to determine if there has been recent activity on the account (the 'YES' branch of step 215).

If there has not been recent activity on the account (the 'NO' branch of step 220), then the method may proceed to step 280 to perform relocation interference on the computing device (discussed below in relation to FIG. 6). However, if there has been recent activity on the account (the 'YES' branch of step 220), the inspection device 112 may take such activity and consider it as an indication that the relocation may have been a result of legitimate activity (e.g., an actual residential move by the subscriber), so that the method proceeds to step 285 and no action is taken. In various embodiments, the inspection device 112 may perform step 220 to determine if there has been recent activity on the account by communicating with and reading the subscriber data records 152 of subscriber management server 111.

In various embodiments, the piracy log and/or the relocation log may be stored within the inspection data records 182 of the inspection device 112. Additionally or alternatively, one or more off such logs may be stored within an alternate server available within the content delivery network (e.g., the subscriber management server 111).

Referring back to step 215, if the device is not identified on the unauthorized relocation log, then the method may proceed to step 225 (the 'NO' branch of step 215).

At step 225, the method may involve determining if the identified computing device 101 is associated with a legitimate account. For example, this may involve the inspection device 112 communicating with and reading the network data records 172 of network router 108 and/or the subscriber data records 152 of subscriber management server 111. If the computing device 101 is not associated with a legitimate account (the 'NO' branch of step 225), then the method proceeds to step 230 to detects if the computing device 101 is pirated. Details of the steps performed to determine if a computing device 101 is pirated are discussed in greater detail below in relation to FIGS. 3-5 below. Additional details of how step 225 can be performed are also discussed below in greater detail below.

At step 235, if the result of step 230 is that the computing device 101 is not pirated (the 'NO' branch of step 235—e.g., if the CAS system may be operational to communicate with the computing device 101), the method may proceed to step 240 to de-authorize the computing device 101 (e.g., using the CAS). However, if the result of step 230 is that the computing device 101 is pirated (the 'YES' branch of step 235), the method proceeds to step 245 to log the computing device on the piracy log. After logging the computing device 101 on the piracy log, the method may proceed to step 250 to perform piracy interference on the computing device 101. Details of the steps performed to perform piracy interference are discussed below in greater detail in relation to FIGS. 7-8.

Referring back to step 225, if the computing device 101 is associated with a legitimate account (the 'YES' branch of step 225), then the method proceeds to step 255 to determine if the computing device 101 has (even though it is associated with a legitimate account) been relocated in an unauthorized manner.

If the device has not been relocated in an unauthorized manner (the 'NO' branch of step 255), then the computing device 101 is presumed to be operating in a legitimate non-pirated, non-relocated manner and the method proceeds to step 285 and no action is taken.

If the result of the determination at step 255 is that the device has been relocated (the 'YES' branch), the method proceeds to step 260 to read records of the subscriber manager server 111 to determine if there the records suggest that the detected relocation is the result of legitimate activity (e.g., there is a record of subscriber communication on the billing account or there is a bulk migration of a number of computing devices 101 from one network segment to another network segment). Additional details of the steps performed to determine if a device has been relocated (e.g., steps 255 to 270 of FIG. 2) are discussed in greater detail in relation to FIG. 6.

At step 270, if it is determined that the relocation detected at step 255 is a result of legitimate activity (the 'YES' branch of step 270), then it is presumed then the computing device 101 is operating in a legitimate manner so the method proceeds to step 285 and no action is taken. However, it if it is determined that the relocation detected at step 255 is not the result legitimate activity (the 'NO' branch of step 270), then the method proceeds to step 230a.

At step 230a, the piracy detection for the computing device 101 is performed. This step is analogous to step 230. As noted above, additional details of the steps performed to determine if a computing device 101 is pirated are discussed in greater detail below in relation to FIGS. 3-5 below.

If the result of step 230a is that the computing device 101 is pirated (the 'YES' branch of step 235a), then the method proceeds to log the computing device 101 on the piracy log (step 245). The method then proceeds to step 250 to perform piracy interference (discussed in greater detail below in relation to FIGS. 7-8).

If the result of step 230a is that the computing device 101 is not pirated (the 'NO' branch of step 235a), then the method proceeds to step 275 and logs the computing device 101 on the unauthorized relocation log (e.g., as referenced at step 215). After the computing device 101 is logged in the unauthorized relocation log, then the method proceeds to step 280 to perform relocation interference. Addition details about the steps performed for unauthorized device relocation interference are discussed below in relation to FIG. 6.

While FIG. 2 describes the overall steps that may be performed by an inspection device 112, in various embodiments of the invention, not all such steps need to be performed. As discussed below with respect to FIGS. 3-8, some steps may be performed independent of others. For example, some steps for detecting a pirated computing device may be performed independent of steps related to detecting unauthorized device relocation or steps related to interference/interdiction. In some embodiments of the invention, some alternative steps for detecting a pirated device or unauthorized device relocation other than what is described herein may be performed, and the described steps for performing interference/interdiction may still be performed.

Detection of Pirated Devices

Traditional detection mechanisms for hacked computing devices 101 may be time and/or network-resource intensive, and may depend on a particular characteristic of the hack that is known in advance. For example, some such traditional methods include scanning all known devices for a specific data characteristic. However, such method can fail or under-report if the hack has been modified in a manner that changes the data characteristic being observed. In another example, hacks that modify an identifier such as a network address or security identifier may duplicate the identifier of another computing device 101, resulting in a hack type known as "cloning". For such hacks, traditional detection mechanisms may only recognize one instance from multiple clones having the same cloned network address.

Some other traditional detection methods effectively duplicate the CAS and add a secondary CAS to the original system. This may be less desirable because they require new hardware and/or software to be added to a computing device 101, the network 102, and/or other components in the system 100. Such systems have difficulty operating on the existing components and facilities of the system 100, and therefore may be impractical to implement.

Figure 3:
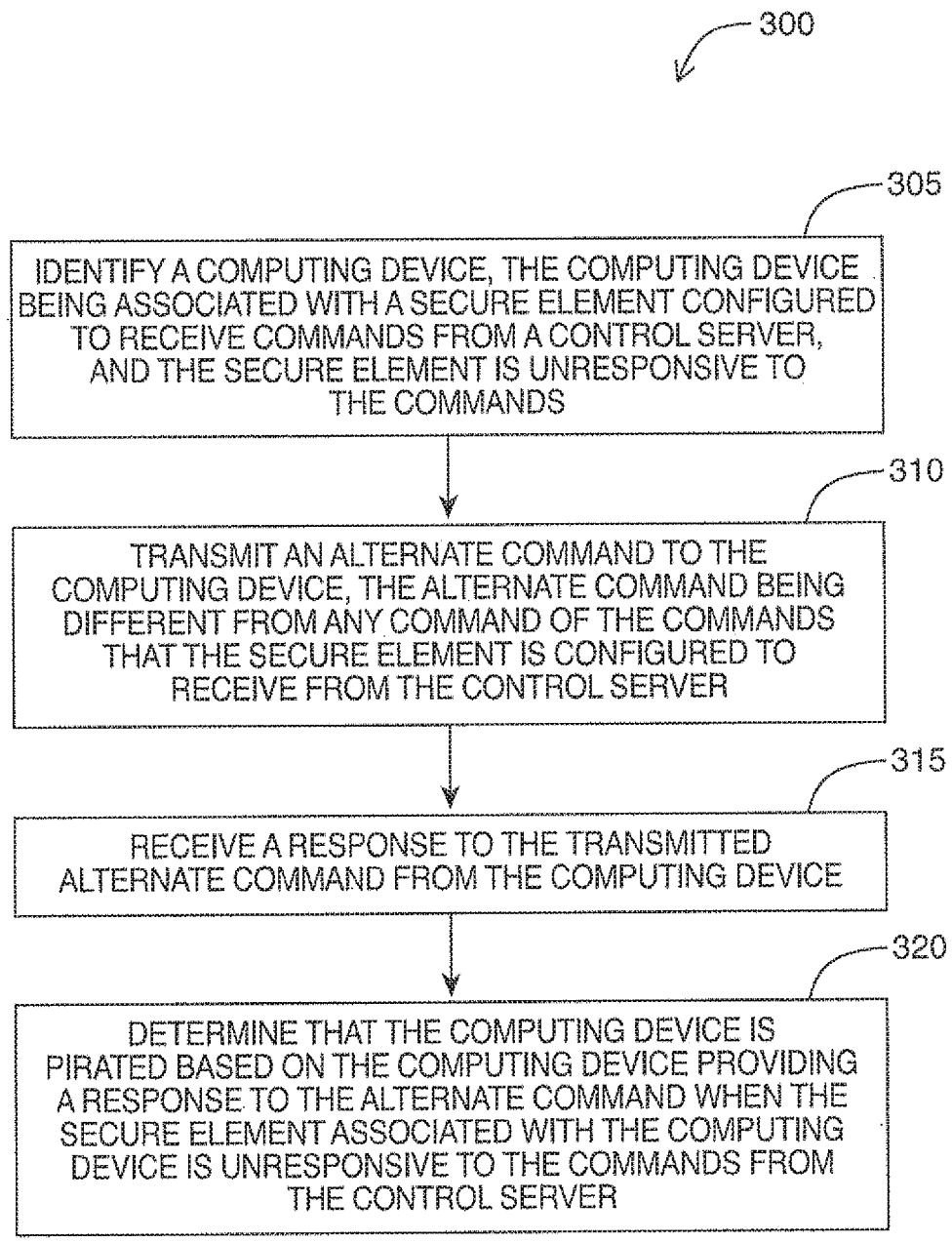
FIGS. 3-5 are flowchart diagrams illustrating steps for detecting a pirated computing device, in accordance with at least one embodiment of the present embodiment.

Referring to FIG. 3, shown there generally as 300 is a flowchart diagram illustrating steps for detecting a pirated computing device, in accordance with at least one embodiment of the present embodiment. In describing the steps of FIG. 3, reference will simultaneously be made to the components of the system shown in FIG. 1. In some embodiments, the various steps of FIG. 3 may be performed by the inspection device 112 of FIG. 1 in the context of step 230 or step 230a in the method of FIG. 2.

At step 305, the method involves identifying a computing device 101, the computing device being associated with a secure element 105 configured to receive commands from a control server 106. As noted above, such commands may be designed to restrict access by the computing device 101 to content available on a content server 160. However, in certain instances where the computing device 101 has been hacked or is pirated, the secure element 105 may be unresponsive to such commands.

In some embodiments, to determine that the secure element 105 is unresponsive to the commands of the control server 106, the inspection device 112 (or other device performing the method of FIG. 3) may make attempts to communicate with the computing device 101 using the commands that are normally within the CAS protocol received by the secure element 105. In some embodiments, the secure element 105 being unresponsive to the commands of the control server 106 may mean that the secure element 105 is inoperative to restrict access by the computing device 101 to the content available on a content delivery network (e.g., content available from a content server 160).

Notably, in situations where the secure element 105 is determined to be inoperative in controlling a computing device 101 or hacked as described herein, operators and providers of CAS and other systems for which security has been compromised typically focus their efforts and attention on updating data or components of the CAS itself. However, it may be difficult to restore control using the CAS because the nature of the hacks are such that secure communications for the CAS that are related to authorizations (and typically used for enabling, correcting or disabling authorizations the computing devices 101) are typically rendered ineffective by a hack.

Still referring to step 305, in some embodiments, to identify the computing device 101, the method include the steps of: analyzing records of a network router 108 to identify a plurality of computing devices 101 that have connected to the network router; and verifying respective device identifiers of the plurality of computing devices 101 against data in one of a control server 106 and a subscriber management server 111. If any device identifier is absent from the corresponding data, then the method may identify the computing device 101 associated with the device identifier as a target for the alternate command. These steps may be considered as additional details of how step 225 of FIG. 2 can be performed; and further details of these steps is discussed below.

In this manner, in one embodiment, the steps of identifying the computing device 101 may be considered to be validating the network data records 172 of a network router 108 against the subscriber records 152 of a subscriber management server 111 to identify computing devices 101 which are suspected to be pirated, and therefore should be made the subject of further detection activities such as is described in FIG. 3 (and potentially, also FIGS. 4-5, as discussed below).

Referring still to FIG. 3, at step 310, the method involves transmitting an alternate command to the computing device 101, the alternate command being different from any command of the commands that the secure element 105 is configured to receive from the control server 106.

At step 315, the method involves receiving a response to the transmitted alternate command from the computing device 101.

In some embodiments, the method additionally may involve determining if the response received from the computing device matches an expected response for the alternate command before determining that a computing device is pirated. For example, the alternate command may be a network command such as 'ping', the method may involve assessing the response to the 'ping' command to determine it is an appropriate response for a 'ping' command. Performing this additional check may provide additional assurance that not only is the computing device 101 present on the network 102, but that certain aspects of its communication protocols may be operational.

At step 320, the method involves determining that the computing device 101 is pirated based on the computing device 101 providing a response to the alternate command when the secure element 105 associated with the computing device 101 is unresponsive to the commands from the control server 106.

The method of FIG. 3 may be desirable in detecting pirated devices by inferring from the active response to an alternate command (when a CAS command is inoperative) that the computing device 101 is pirated. Put another way, an inability to obtain information using CAS protocols when other control mechanisms or protocols are functioning can be taken as an indication that the secure element 105 of the CAS in a computing device 101 is inoperative. Such method may be desirable because the alternate commands used to detect the pirated computing devices 101 are already present on computing devices 101 and components of the system 100 (without requiring additional installation of hardware and/or software to the system 100). Additionally, such commands are unrelated to the authorization control and management mechanisms of the CAS (which may be compromised). While control using the CAS may be inoperative for a computing device 101 because of one of more hacks on the computing device 101, the present embodiments employ control mechanisms or protocols that do not interact with the secure components of the CAS within a computing device 101 that may still be operative. As described herein, such operative non-CAS functions can be used to obtain information from the computing devices 101 and their respective states.

Figure 4:
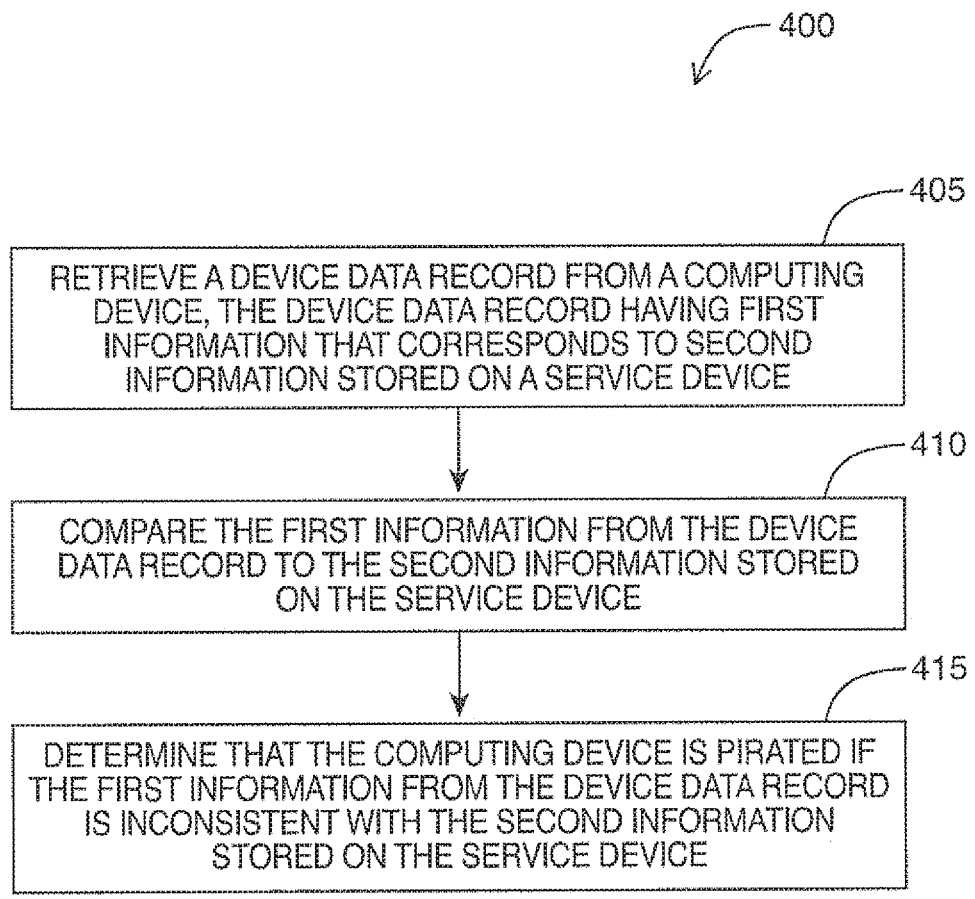

Referring to FIG. 4, shown there generally as 400 is a flowchart diagrams illustrating steps for another method of detecting a pirated computing device, in accordance with at least one embodiment of the present embodiment. In describing the steps of FIG. 4, reference will simultaneously be made to the components of the system 100 shown in FIG. 1. In some embodiments, the various steps of FIG. 4 may be performed by the inspection device 112 of FIG. 1 in the context of step 230 or step 230*a* in the method of FIG. 2.

At step 405, the method may involve retrieving a device data record 113 from a computing device 101, the device data record 113 having first information that corresponds to second information stored on a service device.

At step 410, the method may involve comparing the first information from the device data record 113 to the second information stored on the service device.

At step 415, the method may involve determining that the computing device 110 is pirated if the first information from the device data record 113 is inconsistent with the second information stored on the service device.

Generally, the method of FIG. 4 infers from inconsistencies in the pieces of information that are accessible from both the computing device 101 and a service device that the computing device 101 may be pirated. As noted above, a service device may generally include any device or server within the content delivery network that provides or accesses the content or facilities available therein. For example, in some embodiments, the service device may include control server 106 of the CAS, and the device data record 113 may be retrieved from a secure element 105 provided within the computing device 101. In another embodiment, the device data record 113 is retrieved from a non-secure element 105 component of the computing device 101, and the service device may be a CAS that comprises a secure element 105 associated with the computing device 101 and a control server 106, the secure element being configured to receive commands, from the control server 106, that are designed to restrict access by the computing device to content available on the content delivery network.

When comparing first and second information in the method of FIG. 4, different device-identifying information stored in the CAS and/or subscriber management server 111 may be considered information from a service device. Thus, in some embodiments, the first information of the device data record 113 and the second information stored on the service device may include one or more of: an internal identifier of the computing device 101, a security identifier of the computing device 101, a device make or model of the computing device 101, a software version of an application executing on the computing device 101 that may be provided by such servers/devices, and other like information.

In such case, such information may be retrieved from the computing device 101 and compared to expected values present on the CAS of the subscriber manager server 111. For example, an identifier related to the secure element 105 within a computing device 101 can be retrieved, and compared to the expected value stored in control server 106. Modification of such an identifier within the secure element 105 and/or computing device 101 is one known hack, and therefore a discrepancy between the values in the computing device 101 and the control server 106 may suggest a positive identification of a hacked computing device.

Other data elements of the device data records 113 from a computing device 101 can also be checked against each other or against expected values to determine if there is an inconsistency that indicates a hack. For example, the first information of the device data record 113 may include an authorization expiry date stored on the computing device 101, and the second information stored on the service device may include a maximum authorization duration. In such case, the first information is determined to be inconsistent with the second information if a remaining duration of authorization determined from the authorization expiry date exceeds the maximum authorization duration. Put another way, a command to the computing device 101 may be able to retrieve the expiry date of authorizations that are usually set by the CAS. If the remaining lifespan of the authorizations is longer than the maximum amount expected to be sent by the CAS or beyond a date identified in the CAS, then the particular computing device 101 can be considered hacked.

In some embodiments, consistency between the device data records 113 and data records of other service devices is checked for location information consistency with the CAS or and/or or previous communication from the computing device 101. If an inconsistency is identified, communication with the computing device 101 may be attempted to determine if the behaviour of the computing device 101 reflects expected operational behavior, or instead, is behaving in a manner that raises suspicions that it is hacked.

In alternative embodiments, instead of comparing device data records 113 with data records of service devices to identify inconsistencies that may be indicative of hacks, it may also be possible to compare different types of data records from service devices themselves to identify inconsistencies for the same purpose. For example, the detection of pirated devices may also be performed by analyzing at least one record of network communication of a computing device 101 on a network router 108 and comparing it for consistency to device records on other servers/systems/devices forming part of the system 100 (e.g., managed by the operator of a content delivery network).

One such inconsistency that may arise from such comparison may include simultaneous communication by multiple instances of what appears to be the same device in different locations, referred to as "cloning". Another example that may arise is an authorization inconsistency, where a record of a network router 108 may show that the computing device 101 is communicating on the network 102 in a manner that is not authorized on the CAS or subscriber management server 111 (e.g., the network router 108 shows the computing device 101 connecting on a network branch or segment that is different from what records for the computing device 101 on the CAS or the subscriber management server 111 indicate).

In further alternative embodiments, snapshots of the device data records 113 at different points in time may be compared against each other to determine if any inconsistencies suggest the presence of hacked computing device 101. For example, in such embodiment, a command may be sent to computing device 101 to retrieve one or more device data records 113 from the computing device 101. The content of the data records is then compared to an earlier version of the device data records 113 (e.g., stored on a service device designed for this purpose) previously retrieved from the computing device 101 to determine if they are consistent. Furthermore, if multiple types of records are retrievable from a computing device 101, then one type of record from computing device 101 can be considered device data records 113, and for comparison purposes, a different record from computing device 101 can be for comparison.

In yet further alternative embodiments, as another example of data records of service devices that may be compared against for inconsistencies may include a set of one or more prior records of communication with computing device 101 that are maintained from a source such as network router 108 or other service device. Such set of prior records may be contained in instances of network router 108 or such other service device, may be stored on other servers connected to network 102, or may be stored by an instance of the inspection device (e.g., within inspection data records 182). Examples such prior records include records of all computing devices 101 that have communicated with network router 108 or a service device; records of all computing devices 101 that have communicated within a given time span; records of a predetermined type, such as records of computing devices 101 that attempted to communicate with a network router 108 but failed; records from a different or unexpected network segment; records of attempted communication by computing devices 101 deemed unauthorized by the network; or records of communication that were deemed to be erroneous. Maintaining this prior data may allow for historical comparisons between versions of such data that may reveal a potentially hacked device.

As with the method discussed above in FIG. 3, to identify the computing device 101 from which to retrieve the device data records 113 from, the method of FIG. 4 may perform the steps of: analyzing records of a network router 108 to identify computing devices 101 that have connected to the network router 108; verifying respective device identifiers of the computing devices 101 against corresponding data in one of a control server 106 and a subscriber management server 111; and if any device identifier is absent from the corresponding data, then identifying the computing device 101 associated with the device identifier as a target from which the device data record 113 is to be retrieved. As noted above in relation to FIG. 3, these steps may be considered as additional details of how step 225 of FIG. 2 can be performed.

In one embodiment, to analyze records of a network router 108, bulk processing of such records may be performed. For example, all network data records 172 of a communicating computing device 101 may be extracted from network router 108.

Examples of network data records 172 stored on network router 108 include computing device 101 initialization, authorization, re-authorization, attempted communication whether failed or successful, network address allocation requests, identification (ID) or session allocation requests, transactions, whether based on a valid or erroneous initial message from computing device 101, or valid, erroneous or missing acknowledgement messages from a computing device 101, and other forms of communication.

In one implementation, these network data records 172 may be filtered. Examples of filter criteria include date/time of last communication (it may only be desired to look at records for a predetermined time period or not older than as of a certain date), device types, record volume, and record volume within a predetermined time period. Criteria for the filter may be available directly by way of the means in which the records are queried from network router 108; by running a process to filter for the required criteria; or by running multiple extracts from the network router 108 at different time intervals and comparing between the extracts as a means of filtering.

For example, if a network router 108 contains the number of bytes transmitted from a computing device 101 but no timestamp on last activity, comparing the number of bytes transmitted between separate extracts taken a day apart can indicate that the device has communicated within the last day. The number of bytes can be further used as a filter, where, for example, the number of bytes below a certain level can be considered as not indicative that the device is active, as some classes of computing devices 101 may issue heartbeats or attempt communication when connected to the network without being in authorized use. The number of bytes can also be used as indicators of a type of activity. For example, on a cable modem, a number of bytes above a specified first minimum level but below a second higher level could be indicative of telephony activity but not Internet activity; and a number of bytes above a third and higher level could be indicative of Internet activity.

For each record obtained in the extracted network data records 172 above, a check of a control data record 142 in the CAS (e.g., control server 106) may be performed. Additionally or alternatively, a check may also be performed to determine if the computing device has a corresponding active account showing in the subscriber data records 152 on subscriber management server 111. If either the CAS shows that the computing device 101 should not be authorized, or if no control data record 142 in the CAS can be located, and/or if no active account can be located for the computing device 110 on the subscriber management server 111, then the computing device 101 may be checked to determine if it is pirated.

Referring briefly back to FIG. 2, to the extent this completes step 225 and this results in a determination that the computing device 101 is not associated with a legitimate account, then the method of FIG. 2 may proceed to step 230.

Detecting Cloned Devices

Figure 5:
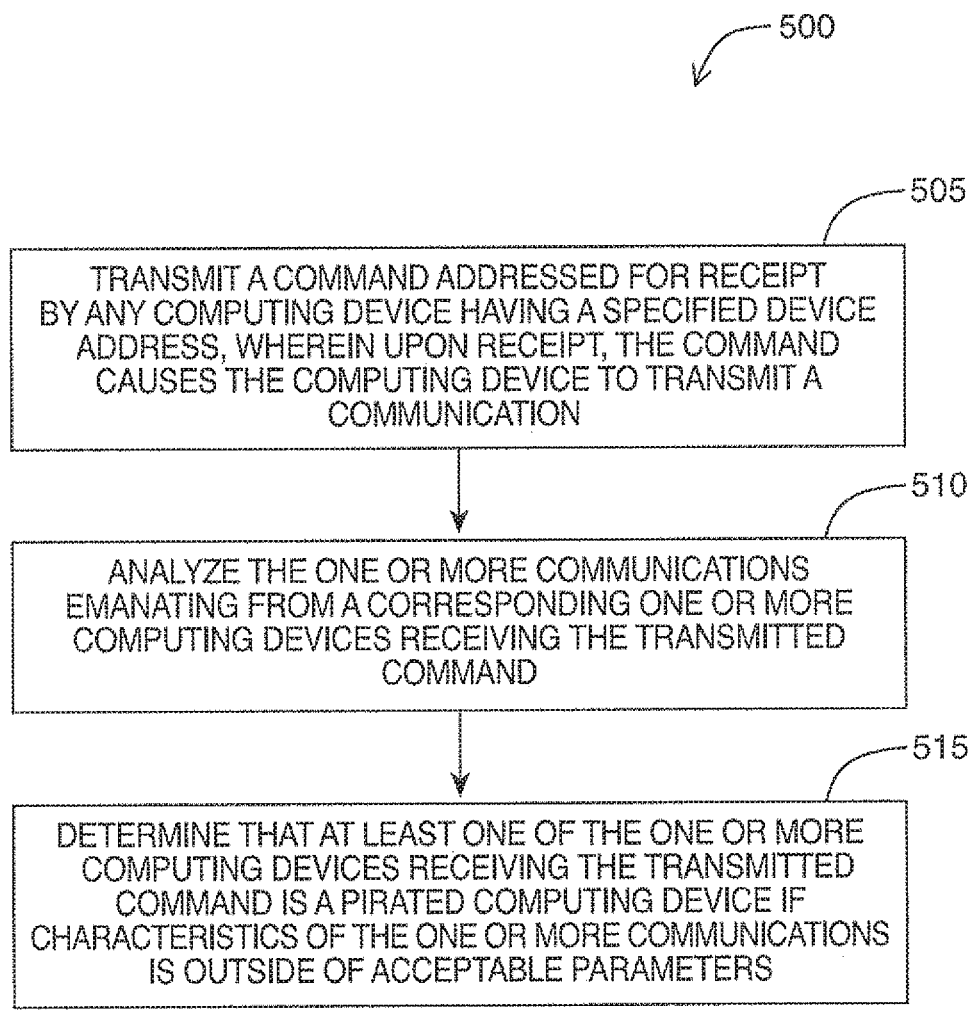

Referring to FIG. 5, shown there generally as 500 is a flowchart diagram illustrating steps for detecting a pirated computing device, in accordance with at least one embodiment of the present embodiment. In describing the steps of FIG. 5, reference will simultaneously be made to the components of the system 100 shown in FIG. 1. In some embodiments, the various steps of FIG. 5 may be performed by the inspection device 112 of FIG. 1 in the context of step 230 or step 230a in the method of FIG. 2.

At step 505, the method may involve transmitting a command addressed for receipt by any computing device 101 having a specified device address, wherein upon receipt, the command causes the computing device to transmit a communication.

In some embodiments, clones can be detected based on the same hardware or physical address (e.g., a Medium Access Control (MAC) address or other network identifiers known to those of skill in the art), such that if a component of network 102 has assigned them separate IP addresses, this would allow separate pings to instances of the clones. Thus, if both IP addresses respond to the pings, then cloning can be confirmed.

At step 510, the method may involve analyzing the one or more communications emanating from a corresponding one or more computing devices 101 receiving the transmitted command.

For example, to analyze the communications emanating from the computing devices 101 may involve retrieving the network data records 172 from multiple network routers 108. A computing device 101 may be considered suspect if records exist in both multiple network routers 108. As was the case in the description of FIG. 4, filters and multiple extracts may be applied to manipulate the network data records 172. By way of example, extracts an hour apart from the two different network routers 108 can use 'bytes transmitted' as a filter to confirm activity within that hour. By using the same filter applied to the same time period on both network routers 108, it may be possible to determine that multiple computing devices 101 with the same network address were communicating on two different network routers 108.

In some embodiments, an attempt may be made to communicate with at least two clone instances detected with the same network identifier to see if both are responding, thereby confirming an instance of cloning.

At step 515, the method may involve determining that at least one of the one or more computing devices 101 receiving the transmitted command is a pirated computing device if characteristics of the one or more communications caused by the transmitted command are outside of acceptable parameters for communications caused by the transmitted command.

For example, in an embodiment, a command can be broadcast to an address of the suspected clone computing device 101 on one or more network 102 segments. The command can be selected or designed to elicit a response from the target computing device 101 and, if present, from one or more clones of the computing device 101 using the specified address. As an example, on some CAS, a reboot or shutdown command can be broadcast to an entire network 102 for a specific MAC address. Upon subsequent restart or power-up, the computing device 101 attempts to communicate with CAS or other similar service device on the network 102.

Noting multiple responses from the MAC address is an indicator that cloning has occurred, and particularly so if multiple responses are received from different segments of the network, or are received within a shorter time interval from each other than would be expected from a single device. For example, if a computing device 101 typically sends out a message ten seconds or more after it is rebooted, then two messages received less than ten seconds apart from the same MAC address is likely to be coming from separate computing devices 101.

A further advantage is gained from the foregoing steps by being able to identify multiple clone instances that may otherwise be invisible on network 102 where, as described herein, the nature of record keeping on some components of the network can mask multiple instances of a clone. Moreover, a lack of detected response from such a command can also indicate a hack if response from other commands to other subsystems of computing device 101 as described herein result in a response.

Thus, in some embodiments, the acceptable parameters for communications caused by the transmitted command is that a single communication will be caused by the transmitted command, and the one or more communications caused by the transmitted command comprises two communications. Additionally or alternatively, the acceptable parameters for communications caused by the transmitted command may be that the one or more communications would emanate from a single network segment, and the one or communications caused by the transmitted command emanates from more than one network segment. In further embodiments, the acceptable parameters for communications caused by the transmitted command is that the one or more communications would not be emanated within a predetermined period of time, and the one or more communications caused by the transmitted command is emanated within the predetermined period of time.

In various embodiments, the command issued in the method of FIG. 5 may be a reboot, startup, and/or shutdown command. In some embodiments, by issuing a further command to obtain device data records 113 at different times and storing all or elements of the device data records 113 obtained from each transmission of such a command in the context of the method of FIG. 5, additional advantages and knowledge of the hack can be obtained.

For example, device data records 113 can be requested each time a reboot or startup record is detected on one of the service devices on the network. In another embodiment, elements of the device data records 113 are saved to a file, database or other data store on each instance of transmission of the applicable data retrieval command. Once this data is retrieved, different instances of the device data records 113 with the same network address can be compared to each other to determine if data elements coming from computing device(s) 101 having a particular address are different. This may allow for a determination of whether the device data records 113 came from the same computing device 101 or from multiple different cloned instances of a computing device 101.

In various embodiments, the appearance of a response or data from a command sent to a computing device 101 may result in multiple responses closely related in time indicating the presence of multiple clones. For example, in one embodiment, a reboot command send to a computing device 101 results in messages in CAS logs ten seconds apart. If the particular device type for a computing device 101 takes twenty seconds following a reboot to generate a log on the CAS, then it is impossible for two such records to be ten seconds apart in the log unless there are two instances of the same device.

As noted above, detection of hacked status for a computing device 101 may be performed by sending at least one CAS control command to a computing device 101, and at least one alternate control command that is not associated with the CAS. If the CAS command fails or fails to respond and the alternate command is successful, then a determination can be made that the computing device 101 is hacked. In the case where there is cloning, this technique may similarly be employed by attempting different forms of communication with computing devices 101 that are suspected of being cloned to see if a given form of communication may work with one computing device 101 but not another computing device 101. By attempting to communicate separately with the potential duplicate computing devices 101, it may be possible to distinguish between which of the duplicate computing devices 101 is legitimate and which are cloned, based on communication response characteristics and data received from the computing devices 101 that indicate a hacked device or which exhibit unexpected operational behavior.

Detecting Unauthorized Device Relocation

Computing devices 101 are often intended by the network operator or content provider to operate in a single location or set of locations on network 102 (e.g., to prevent viewing at a commercial establishment such as a bar or pub). Operators of networks 2 may have business or technical policies that prohibit movement of computing devices 101 between locations and such operators intend to enforce operation of any given computing device 101 from a single originating location.

For example, set-top boxes provided by a cable television operator to a home subscriber are intended to operate solely from the particular subscriber's home. Technical implementation of one or more components of network 102 and associated devices may not be capable of enforcing this single-location policy; may have an error in implementation or may have a configuration error that allows cloned devices to operate. In effect, there may not be any straightforward method to prevent usage of a computing device 101 that has moved to another location. The terms "moved" and "relocated" (and their various derivatives) are used interchangeably herein.

Even if it is possible to identify computing devices 101 that have relocated to another location, traditional methods may not provide a method for interdicting the offending device. Moreover, some traditional methods rely on comparing the location of multiple computing devices 101 on a given account, and only flagging an unauthorized relocation if the multiple computing devices 101 are located in different locations. However, such method may not operate on accounts with only one computing device 101 registered because there is no other device 101 against which to compare locations.

Figure 6:
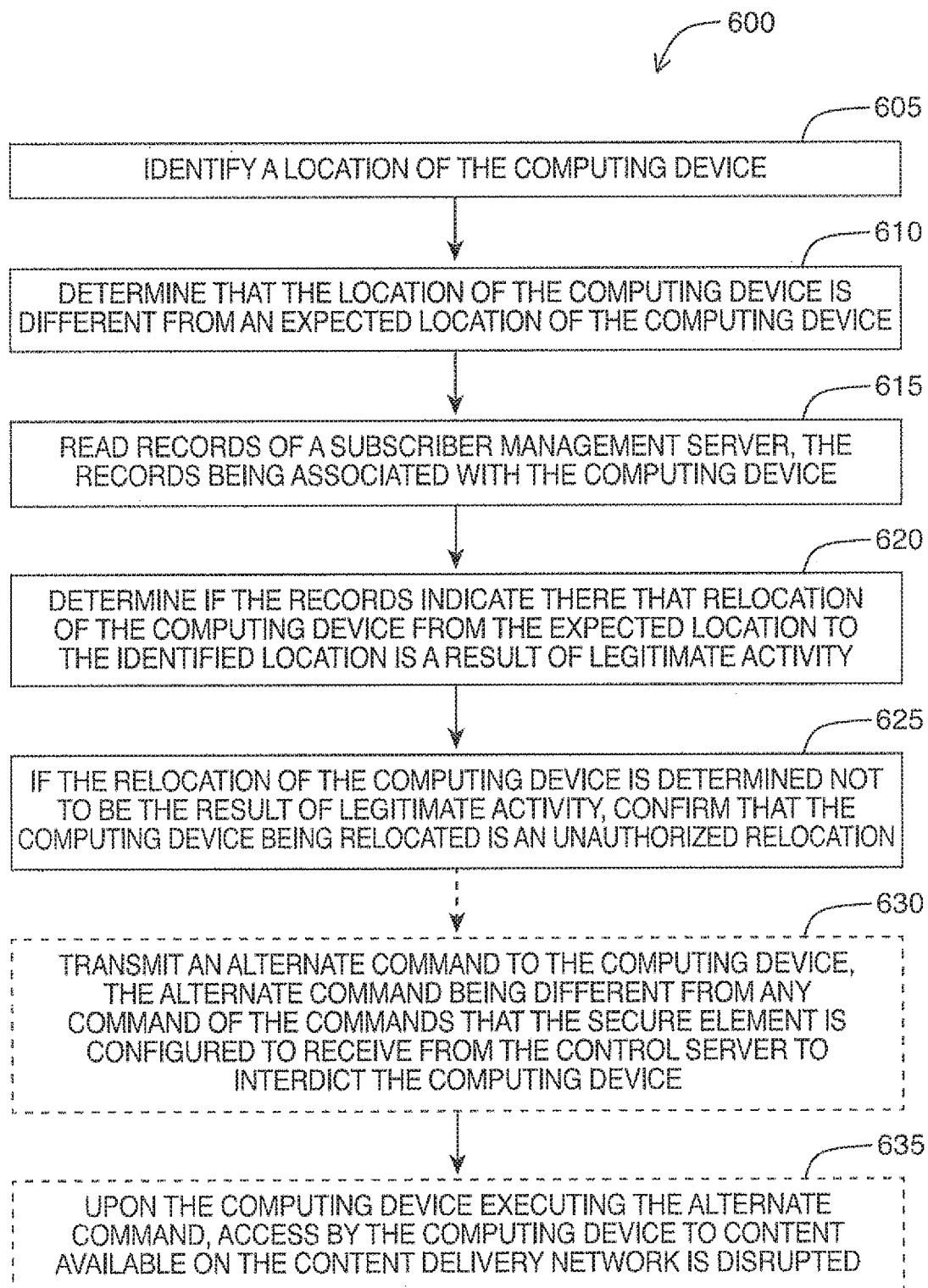
FIG. 6 is a flowchart diagram illustrating steps for confirming unauthorized relocation of a computing device and interdicting same, in accordance with at least one embodiment of the present embodiment.

Referring to FIG. 6, shown there generally as 600 is a flowchart diagram illustrating steps for confirming unauthorized relocation of a computing device and interdicting same, in accordance with at least one embodiment of the present embodiment. In describing the steps of FIG. 6, reference will simultaneously be made to the components of the system 100 shown in FIG. 1. In some embodiments, the various steps of FIG. 6 may be performed by the inspection device 112 of FIG. 1 in the context of steps 255-270 in the method of FIG. 2.

At step 605, the method may involve identifying a location of a computing device 101. In some embodiments, the steps employed to identify a computing device 101 on which to apply the methods of FIGS. 3-5 may be applicable for the method of FIG. 6 also.

Location of a computing device 101 may be determined in a variety of ways. For example, the location may include various indicia of location that can be received from a service device or from the device itself. For example, in various embodiments, the location of the computing device 101 may be determined from time zone of the device 101 or Global Positional System (GPS) coordinates. Additionally or alternatively, in some particular embodiments, the location of the computing device 101 may be identified from a network segment or a network branch on which the computing device 101 is connected to the network 102.

A segment or branch of the network on which the computing device 101 is operating may be determined based on information available from a service device that indicates a physical segment or communication frequency band on a physical segment. If separate instances of service devices or subsystems of service devices are serving separate areas of the network, then each instance of a service device or subservice of service device is considered a separate segment. Examples include downstream or upstream communication paths of a network; frequency bands if used for distinct geographical areas; group of frequency bands used as an aggregate pool of bandwidth for Internet bandwidth or video-on-demand viewing, or separate network routers, VOD servers or other servers.

At step 610, the method may involve determining that the location of the computing device 101 is different from an expected location of the computing device 101. In some embodiments, the expected location of the computing device 101 is determined from a household identifier associated with an account associated with the computing device 101 stored on the subscriber management server 111.

At step 615, the method may involve reading records (e.g., subscriber data records 152) of a subscriber management server 111, the records being associated with the computing device 101.

At step 620, the method may involve determining if the records indicate there that relocation of the computing device 101 from the expected location to the identified location is a result of legitimate activity.

Detection of unauthorized movement or location of a device is done by comparing the device's detected location with prior records of the device's detected location. Because some device movement may occur in the normal course of operation, the invention according to its illustrative embodiments provides methods for determining if the movement might be part of other operations, and therefore not to be subjected to interdiction.

As described in some of the embodiments herein, a change in these values by comparison of the data taken at different times can be used as an indication that a relocation of a computing device 101 is or is not a result of legitimate activity. As an example, in one embodiment, a change in the network segment observed for a computing device 101 and the lack of a corresponding change in the records of the subscriber management server 111 for the account to which computing device 101 may suggest the device has been relocated in an unauthorized manner.

In some embodiments, the records include communication records, and if the communication records indicate that there has been recent communication on an account associated with the computing device, the relocation of the computing device from the expected location to the identified location is determined to be the result of legitimate activity.

In some embodiments, the records include device migration records, and if the communication records indicate that there has been a bulk relocation of multiple computing devices including the computing device 101, the relocation of the computing device from the expected location to the identified location is determined to be the result of legitimate activity.

Referring still to FIG. 6, at step 625, if the relocation of the computing device 101 from the expected location to the identified location is determined not to be the result of legitimate activity, the method may involve confirming that the computing device being relocated from the expected location to the identified location is an unauthorized relocation.

Thus, in embodiments of the invention where operators prohibit device movement outside of a single subscriber home or other location prohibited device movement in itself is a notifiable event, and in addition to or instead of hack verification, interdiction steps may be taken to prevent the device being used in its unintended location.

For example, upon identifying a device which has been relocated or moved in an unauthorized manner, the method may involve interdicting using non-CAS commands (e.g., commands other than which the secure element 105 are designed to receive for indicting the computing device 101). Steps 630 and 635 are for interdicting the computing device 101. However, since they may not necessarily be performed (e.g., it may simply be desired to detect computing devices 101 that have been relocated in an unauthorized manner without interdicting them), these steps are shown in dotted outline in FIG. 6. In some embodiments, these steps may be considered as being performed in the context of step 280 in the method of FIG. 2.

At step 630, the method may involve transmitting an alternate command to the computing device, the alternate command being different from any command of the commands that the secure element is configured to receive from the control server to interdict the pirated computing device.

At step 635, upon the pirated computing device executing the alternate command, access by the computing device to content available on the content delivery network is disrupted. Additional details of the nature of the non-CAS alternate commands (e.g., a continual reboot or a limited channel map) that may achieve the disruption of access to the content is discussed in greater detail below.

Notably, the use of non-CAS alternate commands to perform interdiction does not necessarily have to be as a result of the computing device 101 being hacked such that the computing device 101 is unresponsive to regular CAS commands. Indeed, for a legitimate subscriber who has simply relocated an otherwise legitimately-authorized computing device 101, using a regular CAS command to interdict may prevent usage at the subscriber's regular location. Performing such CAS interdiction may thus cause the subscriber management server 111 to show that the computing device 101 as unauthorized, which may result in the subscriber contacting the operator to have the computing device 101 re-activated. This may result in a situation where after re-activation, the subscriber is still able to access unauthorized content even though they have moved their device from their authorized location.

By using a non-CAS command to interdict only when unauthorized relocation is detected, the heavy-handedness of the CAS command can be avoided. At the same time, the non-CAS interdiction may disrupt access to the content while the computing device 101 is relocated in an unauthorized manner. However, as discussed in greater detail below, if/when such computing device 101 is returned to the authorized location, it will not be detected as being moved in an unauthorized way, and the non-CAS interdiction may terminate and regular service to the subscriber may be restored.

The method of FIG. 6 may provide particular benefits in instances when there are cloned computing devices 101 present on the network 102. In many deployments of CAS and other service devices, there is no ability to store records for separate clone instances of the same computing devices 101. Thus, when cloning is occurring, a CAS controller may have in its records information on an existing instance of a computing device 101. However, when it receives communication in respect of what appears to be the same computing device 101 (but is actually a clone) either directly from the computing device 101 or from/via another device on the network, on many systems, the CAS will simply assume that the instance of computing device 101 has moved on the network 102 and overwrite or otherwise replace an existing record for computing device 101 with the information from the cloned computing device 101 instance.

For example, the newly written information may include information identifying which network segment the new instance of computing device 101 has connected to. If the instance of the computing device 101 is a clone of another instance on another segment, then the record of the prior instance of the clone may be lost. Even if records are kept in logs, these records may still be lost because they may not be monitored or may be frequently truncated.

As another example, in a CMTS for managing cable modems, it will typically be assumed that if a new instance of computing device 101 (namely the cable modem in this example) appears on a different network segment that is managed by the CMTS, then the computing device 101 has moved to a different segment. Other service devices that interact with computing devices 101 known to those of skill in the art can exhibit similar or other behavior that masks the presence of cloned instances of the same computing device 101.

Thus, instead of simply allowing cloned computing devices 101 to connect to the network 102 without ramification, the method of FIG. 6 may allow such cloned computing devices 101 to be detected (because under the method of FIG. 6, such computing devices 101 may appear as an unauthorized relocation).

In another example, the method of FIG. 6 may be implemented in a near real-time embodiment by using log records of the attempted or successful communication of computing device 101 with a CAS upon boot-up of computing device 101. To perform step 605 of identifying a location of the computing device 101, an inspection device 112 may access the CAS logs periodically by running UNIX-type "tail" commands over a remote shell connection from the inspection device to control server 106. Other mechanisms for periodically obtaining new records from a database table, file or other storage medium are known to those of skill in the art.

To determine whether the computing device 101 has moved (step 610), the network location from the logs noted above can be compared to one or more sources which may include one or more of a prior record from the same log. For steps 615 and 620, account records from subscriber management server 111 can be checked to see if the movement was justified because of legitimate activity (e.g., through a change in account or address change of the stored location in CAS for the device; or a change in the subscriber account number). If no corresponding change occurs that would justify movement, then either a hack or unauthorized movement or a hack can be identified as suspected.

Location Determination when Heterogeneous Devices are on Same Account

Multiple computing devices 101 operating from a single account can be determined to be operating from different locations even if they differ in device type, network 102 technology or service device that is used by the computing device 101. For example, to determine the network segment of a computing device 101, the inspection device 112 may use a network router 108 showing usage from data packet counts, and another router that is a video-on-demand server with records showing attempted or actual viewing of a video. In another example, a classic cable set-top and a newer IPTV set-top on the same account may be using the same co-axial cable, but different routing and server equipment on the cable plant and different frequency bands on the cable. Thus, a direct comparison of the network segments and servers used by the different computing devices 101 may not work to detect unauthorized device relocation.

Comparisons could instead be made between pairs of more than two routers (i.e. router A, router B, router C, VOD server D, etc.). For network segment identification, different types of devices may use different network types, frequency bands, identifiers or other mechanisms to identify their network segment. Where segments can be tied to a geographic area and the intended location of devices tied to a geographic area, then mappings between the different segments and identifiers can be used to determine device movement. As one example, a set-top box may be capable of operating using an older Additive Links On-line Hawaii Area (ALOHA) or Digital Storage Media Command and Control (DSMCC) based protocol to communicate with the network, or a newer DOCSIS protocol. While both protocols are supported on the same co-axial cable connecting to a household, they operate on different frequency bands and connect to the operator facilities using different network equipment. The return paths for the older and newer systems can be mapped to show geographic location equivalence or movement. Similarly, services like video-on-demand may operate service groups which map to one or more network segments. Mappings can be created to show equivalence between certain service groups and network segments, either using specific data on the plant, or statistical mapping. For example, such mapping may be made show that the majority of households using a given network segment from a service device type are likely also using another network segment from another service device type.

Unauthorized Relocation Control—Additional Features

As noted above in discussing the use of non-CAS commands to perform movement interdiction, when movement of a legitimately-authorized computing device 101 is detected interference can continue until the computing device C101 is returned to its intended location. To help further accomplish this, in some embodiments, the following steps may be performed: manually verify the operator that the computing device 101 has moved in a prohibited manner; logging of the countermeasures taken as a result of the verification of prohibited movement; and adding one or more records of the moved device to a stored list of moved devices, and augmenting one or more others lists or data stores to in a manner that allows flagging of the identified computing device 101. Such one or more records may contain information relating to the one or more network segments on which the moved computing device 101 is allowed to operate, and on which segment the movement was detected.

The methods described herein to detect movement of computing devices 101 or appearance on the network 102 of computing devices 101 or reappearance of hacked computing devices 101 through polling, real-time monitoring and other methods can be applied to monitor if and when a moved computing device 101 is relocated to an intended (e.g., authorized) network segment. Upon such detection, an embodiment of the invention may automatically reverse applicable countermeasures that require reversal. An advantage of some of the countermeasures described herein is that they may not require a reversal step.

As an example, in an embodiment where upon detection of unauthorized movement of a computing device 101, the countermeasure alternate command is that of issuing a shutdown command to the computing device 101 whenever it appears on an unauthorized segment, so that a reappearance of the computing device 101 on its authorized segment will result in the alternate command no longer being issued. This method therefore has the advantage of being fail-safe. If a system implementing the method of embodiments of the invention is enabled, then, as computing devices 101 are rebooted and detected to be relocated in an unauthorized manner, they will be disrupted as the countermeasure is dynamically re-applied after each reboot. However, once the computing devices are returned to the authorized locations, such disruptions will end.

False Positive Elimination by Monitoring Authorization Activity—Applies to Piracy and Relocation Detection Network operator policies or procedures may allow direct or real-time access to some service devices, but not to others such as billing systems that could be used to identify a legitimate address or account change. Billing system data contains privacy-related data, and may not be accessible by the inspection device 112 for privacy protection reasons. As an example, data from subscriber management server 111 may be provided as a daily extract of account and technical information to be processed by the inspection device 112. Intra-day changes may not be available to show changes in subscriber management server 111, potentially causing a false positive if such data records have changed since receiving the last update from subscriber management server 111.

As another embodiment of the present invention, the detection of changes to a first source of data from network router 108, subscriber management server 111 or other service device can be made without real-time access by accessing logs of service and other change commands communicated from a system like subscriber management server 111 on another device such as network router 108 or other service device. The presence of a record pertaining to a specific computing device 101 can be taken as an indication that a change has been made related to computing device 101. In one embodiment, prior to performing the detection of pirated computing devices or unauthorized device relocation in FIGS. 3-6, a further check can be made to see if there are entries in a communication log of CAS denoting communication from subscriber management server 111 for the computing device 101. An entry in the log that is timestamped or received after the last bulk data update from subscriber management server 111 would indicate that a change may have been made on the subscriber management server 111 for the computing device 101, and the data from subscriber management server 111 may therefore be considered out-of-date and insufficient to justify a movement notification or a further check for a hack.

As an example, and as described previously, a change of address that is registered on subscriber management server 111 would justify a location change on the network for a computing device 101 on an account. While intra-day or real-time access to subscriber management server 111 may not be available to check if the address or other data has changed for a computing device 101 on the subscriber management server 111, a record relating to computing device 101 in a subscriber management server-to-CAS communication on the CAS could be sufficient to suspect that a justifying change may have occurred and no interdiction should take place.

Interfering with the Operation of Detected Pirated Devices

When unauthorized usage is detected on computing devices 101, whether from the methods according to embodiments of this invention or by other means, and whether the unauthorized usage results from hacks, unauthorized movement or other forms of unauthorized activity, the present disclosure describes methods for interfering with the operation of the compromised computing devices 101 by using existing commands, functions and features of the computing devices 101 themselves or network equipment communicating with the computing devices 101 that are operable and accessible despite the CAS having been compromised by a hack.

Traditional countermeasures for the foregoing hacks deployed by operators and vendors of CAS may include distribution of new encryption keys, replacement of a software or hardware component of a secure element 105, or other mechanisms provided by the vendor of CAS known to those of skill in the art. These countermeasures may be expensive to deploy both in terms of component replacement and distribution logistics, or may take a large number of days to distribute or implement. The countermeasures typically require some form of update to data, software, hardware or combination thereof to all computing devices 101 on the network 102. The nature of the hack may allow the hack to be re-applied following such traditional countermeasure. The process of countermeasure deployment may be to deploy an updated mechanism to all legitimate devices computing devices 101, and then activate the updated mechanism, leaving the hacked computing devices 101 inoperable. In practice, operation of the network 102 may be adversely affected because some legitimate computing devices 101 may not have received the update. This may result in errors in system data on CAS that can result in the updated mechanism being sent to an unauthorized computing device 101.

Figure 7:
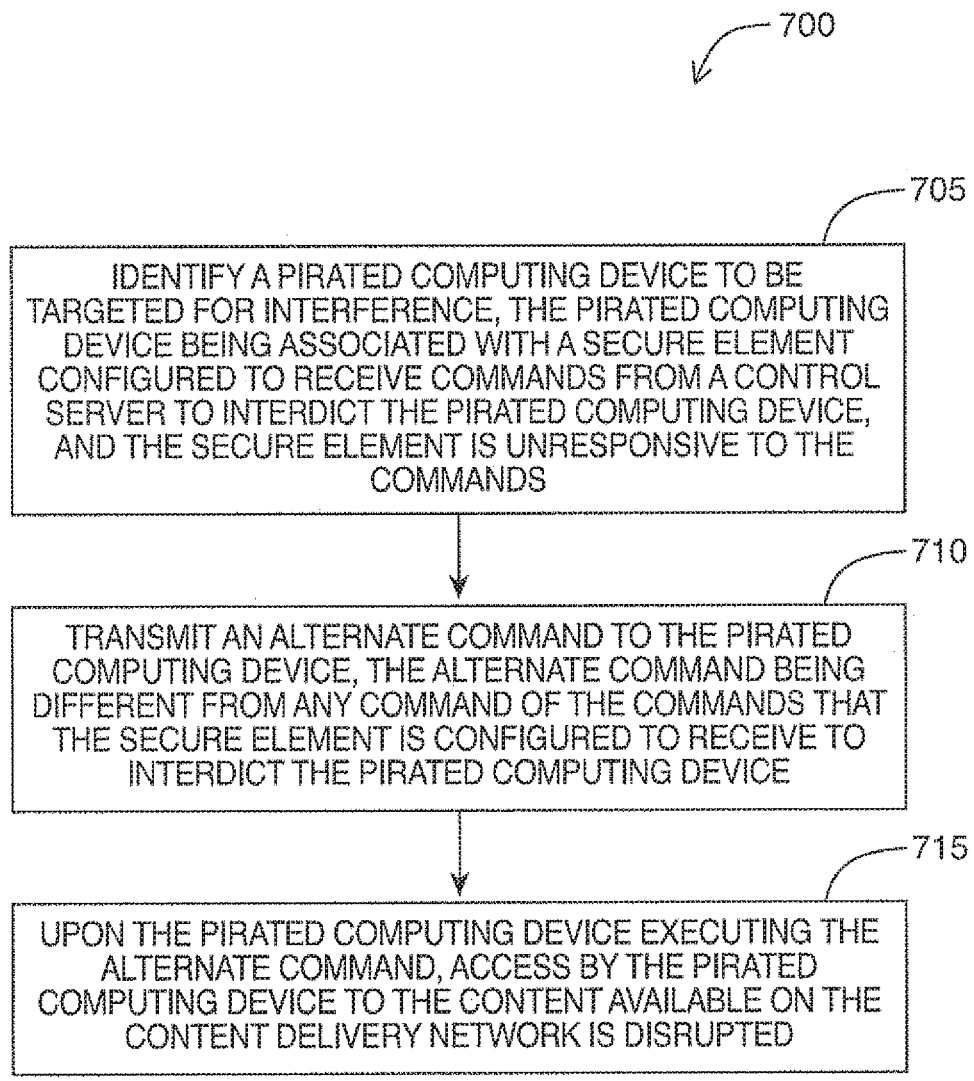
FIGS. 7-8 are flowchart diagrams illustrating steps for interfering with operation of a pirated computing device.

Referring to FIG. 7, shown there generally as 700 is a flowchart diagram illustrating steps for interfering with operation of a pirated computing device, in accordance with at least one embodiment of the invention. In describing the steps of FIG. 7, reference will simultaneously be made to the components of the system 100 shown in FIG. 1. In some embodiments, the various steps of FIG. 7 may be performed by the inspection device 112 of FIG. 1 in the context of step 250 in the method of FIG. 2.

At step 705, the method may involve identifying the pirated computing device to be targeted for interference, the pirated computing device being associated with a secure element configured to receive commands from a control server, wherein the commands are designed to interdict the pirated computing device upon receipt of the commands, and wherein the secure element is unresponsive to the commands.

At step 710, the method may involve transmitting an alternate command to the pirated computing device, the alternate command being different from any command of the commands that the secure element is configured to receive from the control server to interdict the pirated computing device. In various embodiments, the alternate command is selected from: a reboot command and a shutdown command. In various embodiments, the alternate command disrupts network connectivity of the pirated computing device to the content delivery network. In various embodiments, the alternate command may include: drop Internet Protocol (IP) address, release IP address, or renew IP address. In various embodiments, the alternate command inserts garbage data into records of the pirated computing device related to network addresses. In various embodiments, the alternate command comprises a channel change command, and the method further comprises repeatedly transmitting the channel change command to the pirated computing device. In various embodiments, the alternate command updates the channel map of the content channels accessible by the pirated computing device.

Generally, there may be considered to be three categories of commands: (1) CAS-specific (protected) commands intended for disabling or interdicting of services or devices; (2) CAS-specific commands (could also be considered protected) intended for other purposes than disabling/interdicting services or devices (e.g., Arris™/Motorola™ receiver computing devices 101 contains a command to power down the set-top); and (3) non-CA specific (non-protected) commands, which may be run from the CAS or other devices/servers. Examples of commands in category (3) include: for Cisco™ Scientific Atlanta™ computing devices 101, there is a set-top shutdown command (same purpose as the example for category (2)) that is not CAS-protected; and for Motorola™ computing devices 101, a drop IP address command, which the computing device 101 cannot re-acquire until a full power cycle is performed.

The alternative commands discussed herein encompass commands in categories (2) and (3) above. For example, as noted, for the Motorola™ command in category (3), the drop of the IP address effectively disables prevents the computing device 101 from accessing VOD services which are reached over IP.

Commands in category (3) may be more predictably available for computing devices 101. For example, since the Cisco™ command noted above is not a protected command, so it can be used against hacked set-tops to power them down (e.g., to perform both piracy and relocation interdiction/interference). However, for commands in category (2), accessibility may depend on the CAS protected protocol. If the computing device's 101 secure element 105 has been compromised in a way that blocks communication, then command under category (2) may not be available to perform piracy interdiction/interference. However, for non-pirated computing devices 101 that have their CAS-protocol intact and will respond to CAS-protected protocol commands, then commands in category (2) may be used to perform relocation interdiction.

At step 715, upon the pirated computing device executing the alternate command, access by the pirated computing device to the content available on the content delivery network is disrupted. In various embodiments, the disruption of access to content available on the content delivery network by the pirated computing device is restored upon a reset of the computing device, and the method further comprises: analyzing records of a network router to identify appearance of the pirated computing device on the content delivery network; and re-transmitting the alternate command to the computing device.

Figure 8:
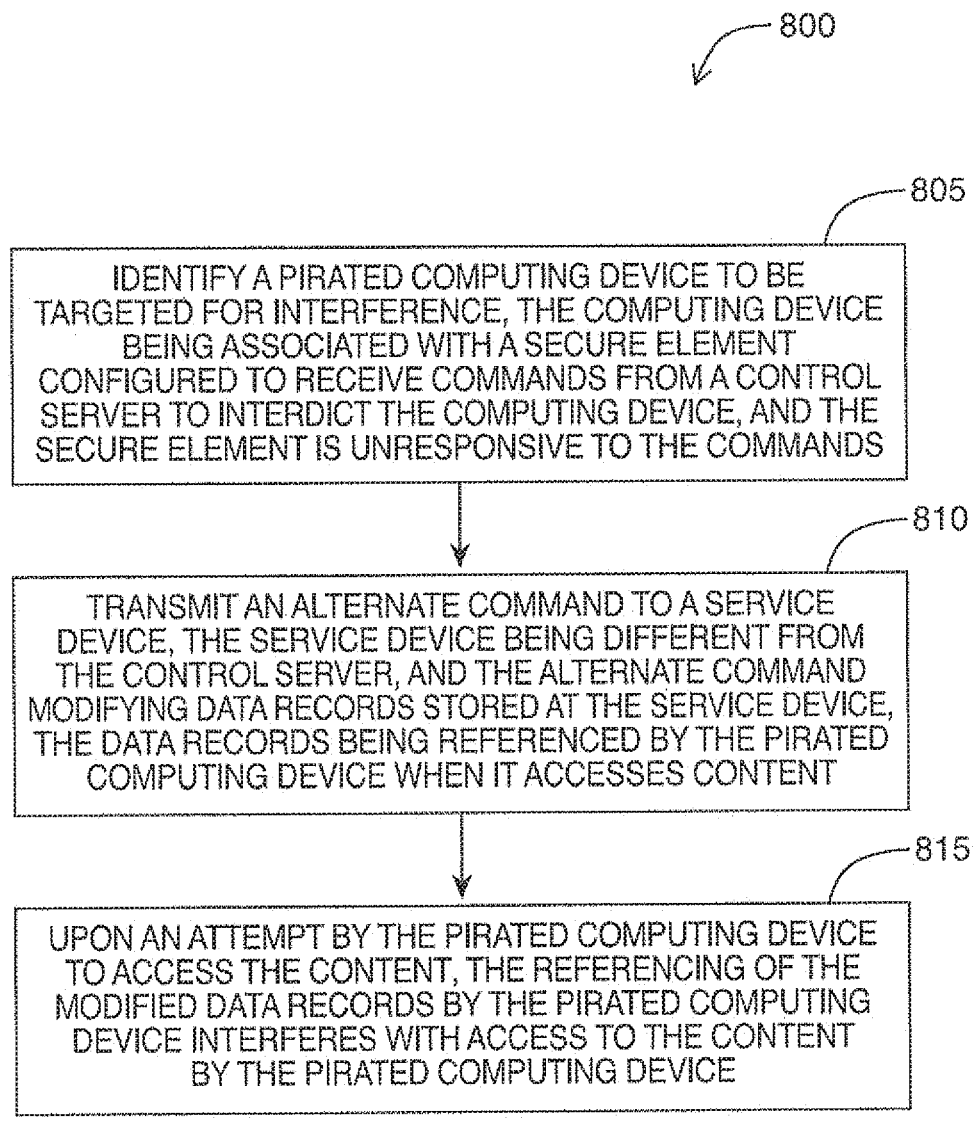

Referring to FIG. 8, shown there generally as 800 is a flowchart diagram illustrating steps for interfering with operation of a pirated computing device, in accordance with at least one embodiment of the invention. In describing the steps of FIG. 8, reference will simultaneously be made to the components of the system 100 shown in FIG. 1. In some embodiments, the various steps of FIG. 8 may be performed by the inspection device 112 of FIG. 1 in the context of step 250 in the method of FIG. 2.

At step 805, the method may involve identifying the pirated computing device to be targeted for interference, the computing device being associated with a secure element configured to receive commands from a control server, the commands are designed to interdict the computing device upon receipt of the commands, and wherein the secure element is unresponsive to the commands.

At step 810, the method may involve transmitting an alternate command to a service device on the content delivery network, the service device being different from the control server, and the service device stores data records referenced by the pirated computing device when it accesses the content on the content delivery network, and the alternate command modifies the data records. In some embodiments, the alternate command comprises a network command that disrupts network connectivity of the pirated computing device to the content delivery network. In some embodiments, the service device comprises a network router and the alternate command is transmitted to the network router to de-allocate a network address previously allocated to the pirated computing device.

At step 815, upon an attempt by the pirated computing device to access the content available on the content delivery network, the referencing of the modified data records by the pirated computing device interferes with access to the content available on the content delivery network by the pirated computing device. In some embodiments, the data records stored by the service device comprises a blacklist registry for computing devices that are denied access to the content available on the content delivery network, and the alternate command comprises adding an identifier of the pirated computing device to the blacklist registry. In some embodiments, the data records stored by the service device comprises identifiers for computing devices that are permitted to access the content available on the content delivery network, and the alternate command comprises deleting an identifier of the pirated computing device from the data records.

As discussed above, alternate commands may be based on commands that can be sent directly to a computing device 101, indirectly through at least one service device, or to at least one service device to prevent service device from providing facilities to computing device 101.

In some embodiments, the present disclosure may be considered as providing for a method that allows interference with a computing device 101 that has been identified as an unauthorized device through hacks, unauthorized movement or other methods external to this invention. This embodiment provides the ability to use at least one alternative command other than CAS control and management commands to interfere with or prevent usage of at least one feature of a computing device 101, and such alternate commands may be operable even when CAS control and management commands are rendered ineffective by a hack.

While described briefly above, further explanations of the possible alternative commands that may be used for interdiction/interface follow. For example, such alternative commands include:

Disabling an authorization on service device or a computing device 101. As examples, VOD systems and IP address allocation subsystem may have their own authorization mechanisms and tables that are separate from CAS. A computing device 101 can be independently de-authorized on these systems, separately from the CAS. The deactivation may involve removing or disabling a right, or may simply be, in the example of an IP address allocation, the deallocation of that address or a direct or indirect command to a computing device 101 to relinquish its address.

Adding a record of computing device 101 to a "non-authorized" or blacklist type registry on service device.

Deleting records pertaining to computing device 101 on a service device so that access by computing device 101 to facilities of the service device is disrupted.

Rebooting computing device 101 or shutting down of computing device 101 through issuance of command to computing device 101, where such a command is supported and available on the computing device 101. If such a command is available separately from the protocols and commands of CAS, then it has the advantage of being usable for interdiction even when CAS is compromised.

Disabling a feature of computing device 101. As an example, in one embodiment, a command can be sent to computing device 101 or a network controller to disable or drop IP address allocation for computing device 101 or its ability to communicate using the IP protocol. This can have the effect of preventing computing device 101 from accessing one or more facilities requiring IP-based communication.

Random, garbage or other harmful data being placed in IP or MAC based records to disrupt operation of computing device 101

Commands to disrupt usage of computing device 101 in a way that adversely affects usage of computing device 101. As an example, forcing a channel change on computing device 101 would be disruptive to a user of 101.

In some embodiments, a computing device 101 or feature of such a device that has been disabled by an alternate command may be re-enabled by a user of the device through operation or manipulation of computing device 101, such as rebooting it or accessing a menu on computing device 101. For example, a de-allocated IP address may be regained by rebooting or power-cycling computing device 101 if the service device responsible for IP address allocation does not have a blacklist feature. In some embodiments, a record of at least one computing device 101 determined to be hacked is maintained, and at least one alternate command is resent at pre-determined or random times to continue interference with computing devices 101 that are listed on such a record.

In some embodiments, at least one alternate command AC14 can be sent each time a hacked computing device 101 appears on the network. Network re-appearance can be determined by several methods, including but not limited to:

Periodic checks of data records or logs at least one service device for the appearance of hacked computing device 101.

Monitoring activity, reboot or startup records or logs for hacked computing devices 101 in at least one service device.

In some embodiments, at least one alternate command can be sent to at least one hacked computing device 101 based a pre-determined schedule, frequency or combination thereof.

In an embodiment where multiple clone instances of hacked computing devices 101 are permitted, alternate commands may be selectively executed to target only certain instances of the clone. This may be desirable if the identifier of the clone is shared with a computing device 101 that is legitimate and authorized to operate in the network 102. In such an embodiment, selection of which instance of the clone will not be targeted can be based on a network segment where the computing device 101 is expected to operate. Examples of methods that can be used to determine which of multiple clone instances should not be targeted may include but is not limited to combinations of one or more of:

Operator manual selection from an interface providing a list of the clones and other supporting information for service devices;

Historical or prior data records indicating where the computing device 101 was previously or originally located while on the account;

Information mapping of allowed network segments to geographical addresses; and

Information from a service device identifying the particular network segments from which a subscriber account is permitted to operate.

In some embodiments, the methods described herein may be relevant even and particularly when hacks are not present. For example, real-time information on subscriber changes to a subscriber management server 111 may not be available. Interdiction of a computing device 101 by sending commands to subscriber management server 111 or CAS could therefore conflict with legitimate command streams and changes that may occur within the same time frame. Furthermore, following interdiction activity, a subscriber could call in and complain that a computing device 101 is not working, and the person taking the call could simply re-authorize the device without checking that the computing device 101 is under interdiction because of unauthorized movement or other form of unauthorized usage.

Selective Issuance of Countermeasure Alternative Commands to Mask Countermeasures In some embodiments, a determination of when to transmit alternate commands can be based on a random interval or on selective issuance only to certain computing devices 101 or certain parts of network 102. This may have the advantage of making it more difficult for hackers or pirates to identify the nature of the countermeasure and compensate for it. Examples of the variations of when to send alternate commands can include individual and combinations of the following:

Certain time windows or times of day;
Certain network segments;
Limited number of hacked computing devices 101;
Limited set of hacked computing devices 101;
Time delays from the appearance of a hacked computing device 101—for example, a newly identified hacked computing device 101 may not receive countermeasures for a limited number of days; and
Activity and inactivity time cycles for the commands.

As an example of usage of the above, a newly-identified hacked computing device 101 might not be issued alternate commands for a week following detection. This could result in the individual or individuals responsible for the hack testing and determining that a newly hacked device is operating as intended, selling it to someone, and that someone being quite disgruntled and angry a week later. As per the features of embodiments of the invention, detection of where the hacked computing device 101 first appears based on retained logs could point to an area where the hacker is enabling the hacked computing device 101. Running the alternate commands AC14 only in areas other than the one where the hacker is hacking the computing devices 101 would allow the hacker to test devices successfully at the hacker location, only to find that the device is inoperative or intermittently operative when the device is deployed at the buyer's location. Other combinations and permutations of these methods may be possible.

Countermeasures Targeting Legitimate Devices

Authorizations and related controls managed by a CAS may indirectly establish control of unauthorized devices by changing how authorization rules are deployed on legitimate devices in a manner that prevents unauthorized devices from accessing one or more facilities. This may provide advantages if countermeasures related to these facilities can be applied to groups of computing devices 101, and have reversibility. However, as noted above, typical countermeasure deployed by operators and providers of CAS require that the changes be applied to all computing devices 101 on the network 102, and are frequently not reversible.

As contemplated herein, in some embodiments, authorization of a computing device 101 may include identification of a channel map that the computing device 101 uses to determine how to access a set of facilities of network 102. As an example, channel map may be: the list of possible viewing channels in a cable TV network for which computing device 101 can be authorized, and information on how to access the channels on the network 102.

A hacked computing device 101 using a given channel map can be prevented from using any channels on the channel map by applying the following method:

Creating a new, second channel map that is functionally equivalent to the old, first channel map;

Sending new authorizations to all computing devices 101 currently authorized to use the first channel map to re-authorize them for the second channel map; and Renaming, modifying and/or eliminating the first channel map Since hacked computing devices 101 are not or cannot be updated by CAS, they will no longer have access to the original, first channel map to determine how to view channels. The first channel map will have been renamed, modified and rendered unusable or only partially usable, or completely eliminated.

Optimization of a Target List to Reduce Countermeasure Activity

In some embodiments, once hacked computing devices 101 are identified, their identifiers may be stored in a list of identified hacked computing devices 101 (as referenced in the method of FIG. 2 above).

As described herein, in some embodiments, such list of identified hacked computing devices 101 is maintained. The steps of a method of the invention according to one embodiment may monitor data from service devices of the network 102 to see if an identified device has re-appeared. As the list grows, the volume of monitoring activity may increase, possibly affecting performance or load on network 102, connected networks or devices connected thereto.

Logging of such monitoring activity may include combinations on one or more of:

A log of appearances and re-appearances of hacked computing devices 101 on the network;

Instances of alternate command execution to target one or more hacked computing devices 101.

To minimize the potential computational resources required for monitoring, periodic maintenance of the list may be performed to achieve one or more of the following:

Determine if a hacked computing device 101 has not re-appeared for a pre-determined period of time;

If this period of time has passed for a given hacked computing device 101, flag the hacked computing device 101 as one that should no longer be periodically polled in list of detected hacked computing devices 101; and Delete the hacked computing device 101 and, if applicable, related flags from the list of identified hacked computing devices 101.

Different periods of time may be specified for different purposes in relation to the foregoing activity. For instance, one time period after which the hacked computing device 101 will be flagged may be to eliminate polling for the computing device 101, and a different time period may be for eliminating the hacked computing device 101 from list altogether.

Potential False Positive Detection Mechanisms

In the event of a system change or reconfiguration by an operator of network 102, inconsistencies may result for large numbers of computing devices 101 in the records obtained from service devices of the network 102. As an example, if a network change requires splitting existing computing devices 101 between an old and new service device in the form of a network router 108, or moving them to a different network segment, a number of computing devices 101 could suddenly show up with a different location without a separate record (e.g., in subscriber management server 111) justifying the location change. Changes in software, service devices or other components may result in modification or changes in the data provided in the data records of various devices/servers in the system 100 of FIG. 1 that may result in false positive identifications of pirated computing devices or unauthorized device relocation.

In one embodiment, prior to taking countermeasures against moved or hacked computing devices 101 that have been identified by one or more methods described herein, a defined time interval may be allowed to elapse, following which determination is made of the number of newly identified relocated or hacked computing devices 101 that have appeared during the elapsed time interval in question. If the number appearing during the time interval exceeds a pre-determined volume, then the invention may be configured to take one or more of the following steps:

Suspend execution of countermeasures;

Suspend execution of countermeasures for computing devices 101 on a network segment if more than a set number of such devices that have moved during the time interval are showing movement on the same network segment;

Issue an alert to the network operator; and

Reverse applicable countermeasures for computing devices 101 against which countermeasures have been applied for a defined interval prior to the time period for which the number of new hacked or moved computing devices 101 was detected.

Other embodiments of methods of the invention may combine steps of the methods of the above-described embodiments of the invention to optimize and combine the steps of identification, validation and countermeasures for hacks.

All publications and patent applications mentioned in this specification are herein incorporated by reference to the same extent as if each individual publication or patent application was specifically and individually incorporated by reference.

While the foregoing disclosure has been described in some detail for purposes of clarity and understanding, such disclosure is provided by way of example only. It will be appreciated by one skilled in the art, from a reading of the disclosure that various changes in form and detail of these exemplary embodiments can be made without departing from the true scope of the disclosure, which is limited only by the appended claims. For example, it should be understood that acts and the order of the acts performed in the processing described herein may be altered, modified and/or augmented (whether or not such steps are described in the claims, figures or otherwise in any sequential numbered or lettered manner) yet still achieve the desired outcome. While processes or blocks are presented in a given order, alternative examples may perform routines having steps, or employ systems having blocks, in a different order, and some processes or blocks may be deleted, moved, added, subdivided, combined, and/or modified to provide alternatives or subcombinations. Each of these processes or blocks may be implemented in a variety of different ways. Also, while processes or blocks are at times shown as being performed in series, these processes or blocks may instead be performed in parallel, or may be performed at different times.

Those skilled in the relevant art will appreciate that aspects of the system can be practised with other communications, data processing, or computer system configurations, including: Internet appliances, cloud computing, multi-processor systems, microprocessor-based or programmable devices, network PCs, mini-computers, mainframe computers, and the like.

Software and other modules may be accessible via local memory, via a network, via a browser or other application in an Application Service Provider (ASP) context, or via other means suitable for the purposes described herein. Examples of the technology can also be practised in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures (e.g., containers) described herein may include computer files, variables, programming arrays, programming structures, or any electronic information storage schemes or methods, or any combinations thereof, suitable for the purposes described herein.

Where a component (e.g. a model, processor, scheduler, display, data store, software module, assembly, device, circuit, etc.) is referred to above, unless otherwise indicated, reference to that component should be interpreted as including as equivalents of that component any component which performs the function of the described component (i.e., that is functionally equivalent), including components which are not structurally equivalent to the disclosed structure which performs the function in the illustrated exemplary embodiments of the invention.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The invention claimed is:

1. A method of confirming unauthorized relocation of a computing device in a content delivery network, the method comprising:
    identifying a current location of the computing device;
    determining that the current location of the computing device is different from an expected location of the computing device;
    reading subscriber data records of a subscriber management server, the subscriber data records being associated with the computing device;
    comparing the identified current location of the computing device with records of historical locations of the computing device from the subscriber data records to determine if relocation of the computing device from the expected location to the identified current location is a result of legitimate activity, the legitimate activity being determined by confirming the existence of a corresponding authorized change applied to a record of the subscriber data records;
    if the relocation of the computing device from the expected location to the identified current location is determined not to be the result of legitimate activity that is associated with the corresponding authorized change applied to the subscriber data record, confirming that the relocation of the computing device from the expected location to the identified current location is an unauthorized relocation.

2. The method of 1, wherein the expected location of the computing device is determined from a household identifier associated with an account associated with the computing device stored on the subscriber management server.

3. The method of claim 1, wherein the current location of the computing device is identified from a network segment or a network branch on which the computing device is connected to the content delivery network.

4. The method of claim 1, wherein the subscriber data records comprise communication records, and wherein the relocation of the computing device from the expected location to the identified current location is determined to be the result of legitimate activity when the corresponding authorized change comprises an indication in the communication records that there has been recent communication on an account associated with the computing device.

5. The method of claim 1, wherein the subscriber data records comprise device migration records, and wherein the relocation of the computing device from the expected current location to the identified location is determined to be the result of legitimate activity when the corresponding authorized change comprises an indication in communication records that there has been a bulk relocation of multiple computing devices including the computing device.

6. The method of claim 1, wherein the computing device comprises a secure element configured to receive commands from a control server, the commands being designed to interdict the computing device upon receipt of the commands, and the method further comprises: transmitting an alternate command to the computing device, the alternate command being different from any command of the commands that the secure element is configured to receive from the control server to interdict the computing device; and
    upon the computing device executing the alternate command, access by the computing device to content available on the content delivery network is disrupted.

* * * * *

UNITED STATES PATENT AND TRADEMARK OFFICE
CERTIFICATE OF CORRECTION

PATENT NO. : 10,652,038 B2
APPLICATION NO. : 15/704239
DATED : May 12, 2020
INVENTOR(S) : Rene Juneau Page 1 of 1

It is certified that error appears in the above-identified patent and that said Letters Patent is hereby corrected as shown below:

In the Claims

Claim 2, Column 36, Line 13, after "method of" insert -- claim --.

Signed and Sealed this
Eighteenth Day of August, 2020

Andrei Iancu
*Director of the United States Patent and Trademark Office*